(12) United States Patent
Schiller

(10) Patent No.: US 8,849,808 B2
(45) Date of Patent: Sep. 30, 2014

(54) METHOD FOR ANALYZING DEMOGRAPHIC DATA

(75) Inventor: Andrew Schiller, Worcester, MA (US)

(73) Assignee: Location Inc. Group Corporation, Worcester, MA (US)

( * ) Notice: Subject to any disclaimer, the term of this patent is extended or adjusted under 35 U.S.C. 154(b) by 293 days.

(21) Appl. No.: 12/720,817

(22) Filed: Mar. 10, 2010

(65) Prior Publication Data

US 2010/0185620 A1    Jul. 22, 2010

Related U.S. Application Data

(63) Continuation of application No. 11/331,262, filed on Jan. 11, 2006, now Pat. No. 7,680,859, which is a continuation-in-part of application No. 10/329,179, filed on Dec. 23, 2002, now Pat. No. 7,043,501.

(60) Provisional application No. 60/342,285, filed on Dec. 21, 2001.

(51) Int. Cl.
*G06F 17/30* (2006.01)
*G06Q 30/02* (2012.01)

(52) U.S. Cl.
CPC ...... *G06F 17/30241* (2013.01); *G06F 17/3087* (2013.01); *G06Q 30/02* (2013.01); *Y10S 707/918* (2013.01)
USPC ............ 707/724; 707/752; 707/758; 707/918

(58) Field of Classification Search
CPC ........................... G06F 17/30864; G06F 17/24

USPC ........ 707/758, 918, 724, 743, 723, 748, 752; 701/213

See application file for complete search history.

(56) References Cited

U.S. PATENT DOCUMENTS

| | | | | |
|---|---|---|---|---|
| 594,040 | A | * | 11/1897 | Skriver ........................... 66/118 |
| 5,680,305 | A | * | 10/1997 | Apgar, IV .................... 705/7.28 |
| 5,948,040 | A | * | 9/1999 | DeLorme et al. ............. 701/426 |
| 6,038,554 | A | | 3/2000 | Vig |
| 6,178,406 | B1 | * | 1/2001 | Cheetham et al. ........... 705/7.34 |
| 6,487,495 | B1 | | 11/2002 | Gale et al. |
| 6,553,310 | B1 | * | 4/2003 | Lopke ........................... 701/454 |

(Continued)

FOREIGN PATENT DOCUMENTS

| | | |
|---|---|---|
| EP | 0747671 A2 | 11/1996 |
| WO | 9716796 | 5/1997 |
| WO | 0219216 A2 | 3/2002 |

OTHER PUBLICATIONS

Maptitude: Putting Location in Real Estate, Published by Caliper.com on Oct. 2, 2003, pp. 1 - 7, at www.caliper.com/maptitude/RealEstate/default.htm, accessed at web.archive.org/web/20031002101957/http://caliper.com/maptitude/realestate/default.htm on Mar. 24, 2014.*

(Continued)

*Primary Examiner* — Robert Beausoliel, Jr.
*Assistant Examiner* — Alexandria Bromell
(74) *Attorney, Agent, or Firm* — Sean D. Detweiler, Esq.; Morse, Barnes-Brown & Pendleton, P.C.

(57) ABSTRACT

A computer implemented method of generating an ordered list of geographical locations having similarities in preselected categories relative to a first geographical location.

16 Claims, 29 Drawing Sheets

(56) References Cited

U.S. PATENT DOCUMENTS

| | | | |
|---|---|---|---|
| 6,671,404 | B1 | 12/2003 | Kawatani et al. |
| 6,879,960 | B2 | 4/2005 | Nascenzi et al. |
| 6,947,605 | B2 | 9/2005 | Prakash et al. |
| 7,016,866 | B1* | 3/2006 | Chin et al. ............. 705/26.7 |
| 7,043,501 | B2 | 5/2006 | Schiller |
| 7,421,422 | B1 | 9/2008 | Dempster et al. |
| 7,680,859 | B2 | 3/2010 | Schiller |
| 2002/0035535 | A1 | 3/2002 | Brock, Sr. |
| 2003/0036848 | A1* | 2/2003 | Sheha et al. ............. 701/209 |
| 2004/0005449 | A1* | 1/2004 | Sugimoto et al. ......... 428/304.4 |
| 2004/0006559 | A1* | 1/2004 | Gange et al. ............. 707/3 |
| 2004/0030631 | A1* | 2/2004 | Brown et al. ............. 705/37 |
| 2004/0098269 | A1* | 5/2004 | Wise et al. ............. 705/1 |
| 2005/0288958 | A1* | 12/2005 | Eraker et al. ............. 705/1 |
| 2006/0190279 | A1 | 8/2006 | Heflin |
| 2006/0229807 | A1* | 10/2006 | Sheha et al. ............. 701/209 |
| 2007/0100644 | A1* | 5/2007 | Keillor et al. ............. 705/1 |
| 2008/0076451 | A1* | 3/2008 | Sheha et al. ............. 455/456.3 |
| 2008/0183598 | A1* | 7/2008 | Carr et al. ............. 705/27 |
| 2009/0271307 | A1* | 10/2009 | Brock, Sr. ............. 705/35 |
| 2012/0011137 | A1* | 1/2012 | Sheha et al. ............. 707/758 |
| 2013/0254072 | A1* | 9/2013 | Eraker et al. ............. 705/26.64 |

OTHER PUBLICATIONS

Maptitude: Putting Location in Real Estate, Published by Caliper. com on Oct. 2, 2003, pp. 1-7, at http://www.caliper.com/maptitude/RealEstate/default.htm, accessed at http://web.archive.org/web/20030615000000*/http://www.caliper.com/maptitude/RealEstate/default.htm on Mar. 24, 2014.*

Non-Final Office Action for U.S. Appl. No. 10/329,179, dated Jun. 13, 2005.

Non-Final Office Action for U.S. Appl. No. 11/331,262, dated Feb. 19, 2008.

Non-Final Office Action for U.S. App. No. 11/331,262, dated Sep. 2, 2008.

Final Office Action for U.S. Appl. No. 11/331,262, dated Jul. 21, 2009.

Notice of Allowance for U.S. Appl. No. 10/329,179, dated Oct. 13, 2005.

Notice of Allowance for U.S. Appl. No. 11/331,262, dated Dec. 18, 2009.

* cited by examiner

☐ Portuguese speaking
☐ Russian speaking

SUBMIT

* Note: Best results are often achieved by choosing only one or a few key words. As you add more key words each one becomes less important in calculating your best matching neighborhoods.

© Copyright 2001 Location Inc Group

Fig. 13

Summary of Search Results

WHERE AM I?
1. Specify what you want
2. Select a search area
3. Get your results

YOUR SEARCH CRITERIA

Find me a neighborhood like this: Historic homes, Large dwellings [CHANGE]

Search here: within 5 miles of Newport, RI [CHANGE]

MATCHING NEIGHBORHOODS

Viewing results: 1 - 5  [NEXT]

In our current example, the user has chosen historic homes, and large homes. The user then chose to search within 5 miles of Newport, RI. Matches were calculated as describe in the preceding slide, and the two top matching locations to the selected set of key words are shown here. As can be seen, the best matching location is an 82% match to the selected key words.

| LOCATION (click on neighborhood for information) | RANKING | MATCH LEVEL | AVAILABLE HOUSES | AVAILABLE APARTMENTS |
|---|---|---|---|---|
| Newport RI neighborhood #9 | 1 | 82% | 2 | 2 |
| Middletown RI neighborhood #3 | 2 | 78% | 2 | 2 |

Fig. 17

Neighborhood comparison table

| Newport, RI neighborhood # 9 | The key words you selected |
|---|---|
| Neighborhood Look & Feel | |
| The Buildings | |
| • Age | |
| Mostly Established but not old, Some Well established older homes, Some Historic homes, Some Newer Homes | Historic homes |
| • Size | |
| Mostly Medium-sized dwellings, Some Small dwellings, Some Large dwellings | Large dwellings |

Here we see that this location in Newport, RI was an 83% match to the key word "historic homes," and an 82% match to the key word "large dwellings." This means that this location has a greater proportion of homes characterized as historic than does 83% of the census tracts in America, and this location has a greater proportion of large homes than does 82% of the census tracts in America.

In the left-hand columns are listed in descending order the actual percentages of buildings in each class, while the matches are based on the percentages of census tracts in America that have fewer percentages of the types of buildings the user wishes to have in a location. Thus, the left-hand column shows the user what to expect in the location (Newport, RI neighborhood#9), and the match level shows how this census tract falls relative to other census tracts in America in regards to the characteristics chosen by the user (historic homes and large homes).

Fig. 18

Neighborhood Look and Feel

▶ The Buildings

- Age
  - ☐ Consider all
  - ☑ Newer homes
  - ☑ Established but not old
  - ☑ Well established, older homes (mostly)
  - ☑ Historic

- Size
  - ☐ Consider all
  - ☑ Large homes/apartments
  - ☑ Medium-sized homes/apartments (mostly)
  - ☑ Small homes/apartments

- Type
  - ☐ Consider all
  - ☐ Single-family detached homes
  - ☐ Rowhouses and attached homes
  - ☐ Small apartment buildings
  - ☑ Complexes or high rise apartments (mostly)
  - ☐ Mobile homes

Fig. 22

- Ownership [Owners ▾]

▲ The Setting

- Densely urban to remote
  - ☐ Consider all
  - ☐ Densely urban
  - ☐ Urban
  - ☒ Suburban (mostly)
  - ☐ Rural
  - ☐ Remote

- Land and Water
  - ☒ Consider all
  - ☐ Coastal
  - ☐ Farms

▲ Special Character
  - ☐ Consider all
  - ☐ Nautical
  - ☒ Walkable
  - ☒ Quiet
  - ☒ Artsy/funky
  - ☒ Urban sophisticates

Fig. 23

▶ Ethnicity/ancestry

☑ Manufacturing & Laborers
☐ Farmers, foresters, or fishers
☑ Government employees ☐ Consider all
☐ Hispanic (all Hispanics)
  ☐ Puerto Rican
  ☐ Mexican
☐ Black
☑ White (non-Hispanic) (mostly)
☑ East Asian
☐ Asian Indian
☑ Arabian
☑ Irish ancestry
☑ Italian ancestry ▶ Language ☐ Consider all
☑ English speaking (mostly)
☐ Spanish speaking
☐ Italian speaking
☐ French speaking
☐ Portuguese speaking
☐ Russian speaking

Fig. 25

Here the results are presented with match levels. One can see that the 2nd best match in the search area is the original, unmodified neighborhood itself. The best match is a location in Holden, MA.

The unique calculation used to match modified locations is shown in the next slide

YOUR SEARCH CRITERIA

Find me a neighborhood like this: 39 Wildrose Avenue Worcester, MA MODIFIED: Public Schools 10, Crime rate 10

Search here: within 15 miles of Worcester, MA

BEST MATCHING NEIGHBORHOODS

Viewing results: 1 - 5

| LOCATION (click on neighborhood for information) | RANKING | MATCH LEVEL | AVAILABLE HOUSES | AVAILABLE APARTMENTS |
|---|---|---|---|---|
| Holden MA neighborhood #3 | 1 | 91% | 2 | 2 |
| Worcester MA neighborhood #8 | 2 | 90% | 2 | 2 |
| Shrewsbury MA neighborhood #4 | 3 | 90% | 2 | 2 |
| Ashland MA neighborhood #1 | 4 | 90% | 2 | 2 |
| Leicester MA neighborhood #1 | 5 | 89% | 2 | 2 |

Fig. 29

METHOD FOR ANALYZING DEMOGRAPHIC DATA

CROSS REFERENCE TO RELATED APPLICATION

This application is a continuation of U.S. patent application Ser. No. 11/331,262, filed Jan. 11, 2006, (now U.S. Pat. No. 7,680,859), which is a continuation-in-part of U.S. patent application Ser. No. 10/329,179, filed Dec. 23, 2002, (now U.S. Pat. No. 7,043,501), which claims priority to provisional patent application No. 60/342,285, filed on Dec. 21, 2001. The priority of this prior application is expressly claimed and its disclosure is hereby incorporated by reference in its entirety.

BACKGROUND OF THE INVENTION

The present invention relates to a system for analyzing and comparing demographic and other data related to identifiable geographic areas to evaluate their similarity or dissimilarity. More specifically, this invention relates to a new system for calculating numeric values that are related to identifiable characteristics for a specific area of the country based on that area's demographic and other information and comparing it to similarly generated numbers for another area of the country to determine the relative similarity or differences. A forty-page inventor's disclosure is attached which illustrates the present invention.

Currently, a broad range of data regarding the character of particular areas of the country is available for public access. The data however is in raw form. Data describing the demographics, crime rates, educational quality, housing characteristics, employment opportunities, climates and geographic data is all available for review. The difficulty is that none of the data is presented in a manner that facilitates accurate and easy comparison between selected geographic areas that can incorporate multiple characteristics regarding each area. Although many services attempt to provide comparison information, the accuracy provided by these systems is questionable. For example, if a person wished to find several cities that had similar characteristics and qualities to the town in which they currently live, they would have to first find the city in which they are interested and subsequently search all of the data manually to find cities having similar data sets.

The other difficulty is that the data that is available is primarily numeric making searching difficult. Before a user could search the data to arrive at a useful result, the user would have to have a thorough understanding of the rating system or systems used in the database.

SUMMARY OF THE INVENTION

In accordance with the present invention a system is provided that automatically analyzes and compares the data available in the database to produce a result based on user selected input and desired characteristics. The present invention provides both for a system of analyzing the available data and a method of automatically comparing the data to arrive at a listing of comparable geographic areas based on the users desired characteristics. The first aspect of the present invention is the utilization of known statistical and mathematical functions using Principal Components Analysis to produce factors followed by squared Euclidean distance calculated on these resulting factors. This mathematical function is applied to compare large amounts of demographic, crime, school and geographic data for identifiable locations all across America relative to each other. The result of this unique mathematical function provides a quantitative value for each pair of locations that are compared providing a matrix containing a quantitative measure of dissimilarity for each compared set of locations in America.

The method first compares the numbers related to the first chosen characteristic of each geographic area of interest, calculates their difference and squares it. The method then repeats this calculation on the second chosen characteristic and adds the result to the result of the first calculation. This process is repeated using each of the identifiable characteristics related to the given geographic areas. This aggregate number is then placed in a matrix in the location identified by the intersection of the row containing the first geographic area of interest and the column containing the second area of interest. The larger the accumulated value between any two intersecting rows and columns in this matrix, the more dissimilar those two locations are based on all of the factors used to describe the locations. Small numeric values between any two locations in the matrix means those locations are quite similar to each other based on all of the factors used to describe the locations. Thus, the present invention provides a system for the development of quantitative measures of similarity between all locations in America.

The second component of the present invention is the use of key word descriptors that provide a verbal expression describing features and characteristics of locations, where each key word is related to and associated with the quantitative values provided in an underlying data base that reflect local conditions in particular geographic areas. This component allows users of the application to select verbal, natural language descriptors in the form of these key words to easily relate to and identify characteristics that they find desirable about a geographic location and instruct the application of the present invention to find locations that most closely match the chosen characteristics. Using key words that correspond to identifiable quantitative values to describe locations creates an interface that allows the users never to have to think in quantitative terms, while still requesting a list of locations that have the characteristics that they want. Once the user selects the key words that correspond to the characteristics that they find desirable, the application of the present invention automatically converts the key words to quantitative values and performs an average absolute difference calculation to compute a value corresponding to the selected set of keywords and calculate the overall level of similarity between the key words a user chooses, and real locations that exist.

The final component of the application of the present invention is the ability of the user to choose a location they presently find desirable and view the set of key words that are associated with that location. The user can then modify the set of key words by selecting or unselecting key words that describe the location and adding or subtracting key words that they either like or dislike, resulting in a modified set of key words. This new set of key words can then be used as a new set of search criteria to find locations that best match these newly selected key words. This allows a user to find locations that are comparable to an existing location that they like, but with, for example, less crime, better schools, or less expensive housing. Again, as stated above, once the set of keywords is provided by the user, the application automatically calculates the average absolute difference between all of the data base values using the value for the original location, in combination with the newly modified keywords selected by the user.

The present invention therefore as described above provides both for the underlying method of analysis of the demographical and location data, the various means of user interface provided in the application and the process whereby the application is used by a user to provide meaningful analysis and produce ordered search results based on characteristics of the locations in relation to user selected search criteria.

BRIEF DESCRIPTION OF THE DRAWINGS

In the drawings which illustrate the best mode presently contemplated for carrying out the present invention:

FIG. 2 is an interface wherein a user specifies a desired location he likes by typing in a reference address;

FIG. 6 is an interface that allows a user to access and review the locations found in FIG. 4;

FIGS. 8-13 depict search categories for use in connection in with the keyword search feature;

FIGS. 14-18 depict the manner in which matches are determined between combinations of selected key words, and real locations; and FIGS. 19-29 depict the manner in which a user can employ a modified keyword search to select a match that differs in a specific feature from the initially selected location.

DETAILED DESCRIPTION OF THE INVENTION

Figure 1:
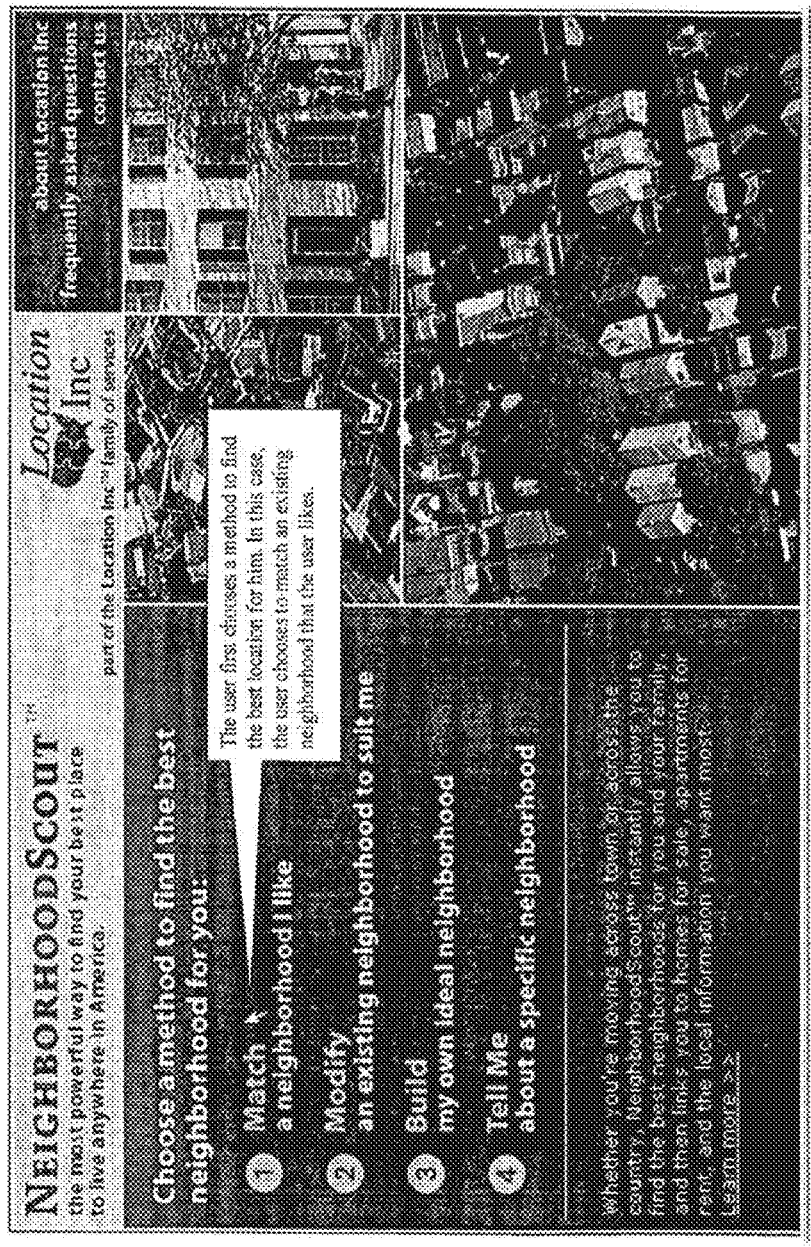
FIG. 1 is an interface wherein a user chooses a method to find a suitable.

Referring now to the drawings, the invention will be described in greater detail.

The first distinctive component is the utilization of known statistical and mathematical functions (Principal Components Analysis followed by squared Euclidean distance calculated on the resulting factors) applied to large amounts of demographic, crime, school, and geographic data for locations all across America. The result of this unique combination is the creation of a matrix containing a quantitative measure of dissimilarity for all locations in America. The larger the value between any two intersecting rows and columns in this matrix, means those locations are more dissimilar based on all of the factors used to describe the locations. Small numeric values between any two locations in the matrix means those locations are quite similar to each other based on all of the factors used to describe the locations. Thus, this approach allows the development of quantitative measures of similarity between all locations in America.

The second distinctive component of this application is the use of key words that describe features and characteristics of locations, where each key word is linked to quantitative values in an underlying data base, values that reflect local conditions. This unique approach allows users of the application to select these easy to understand key words to choose what characteristics they wish to have in a location, and then ask the application to automatically find locations that most closely match those chosen characteristics. Using key words that describe locations linked to quantitative values in a data base means users never have to think in quantitative terms, but can still request to find those locations that have characteristics they want.

The third distinctive component of this application is the use of an average absolute difference calculation to compute the match level between any or a set of key words a user chooses, and real locations that exist.

The fourth distinctive component of this application is the ability of the user to choose a location they like, and then select or unselect key words that describe the location, resulting in the modification of the location descriptors and, thus, a new set of search criteria to use to find locations that best match these modified criteria. This allows a user to find locations just like a location they like, but with, for example, less crime, better schools, or less expensive housing. To find best matching locations to these modified criteria, average absolute difference is calculated between all of the data base values for the original location, in combination with the new modifications selected by the user. Each of these four unique characteristics is further described below.

Figure 2:
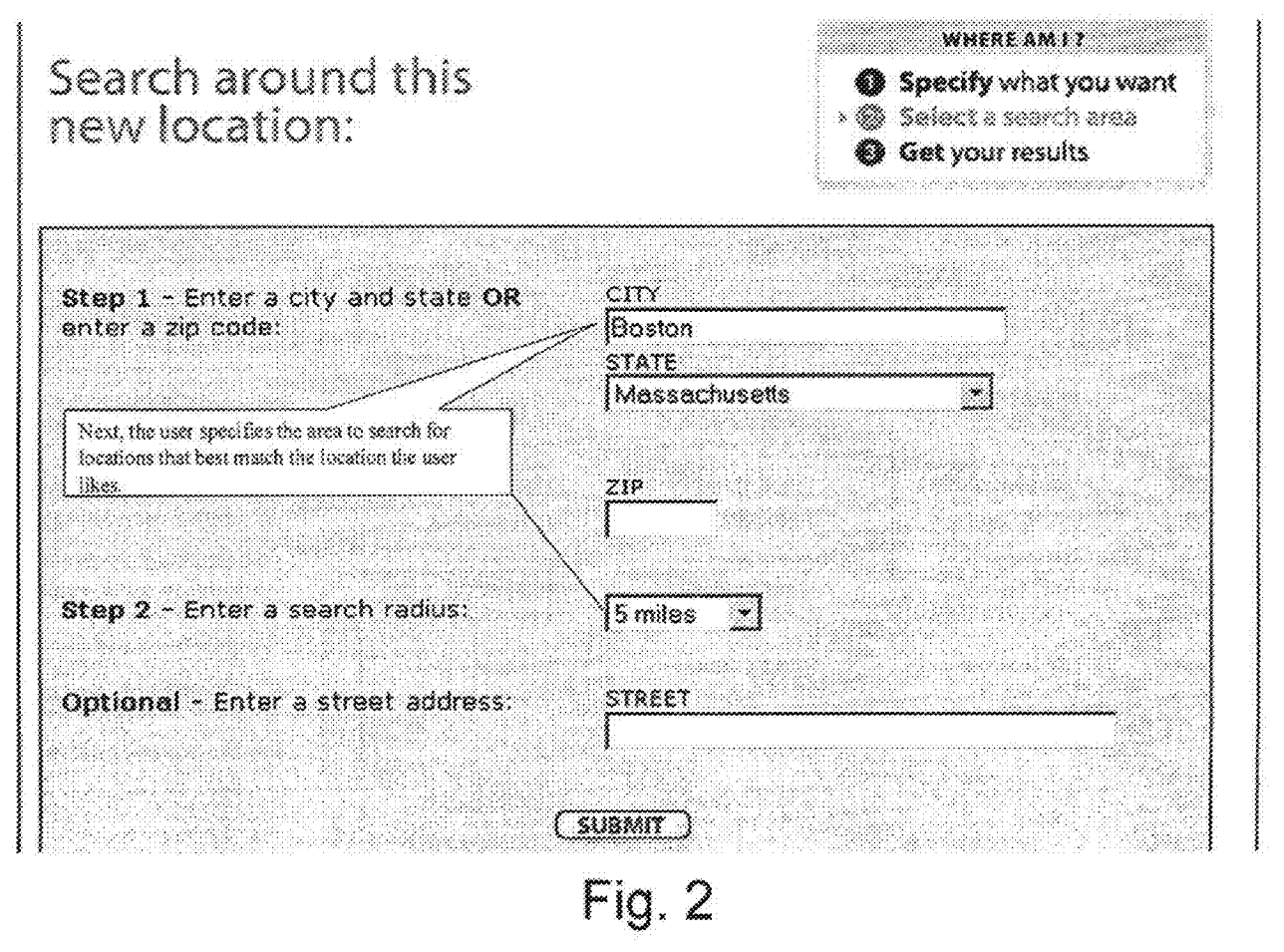
Figure 3:
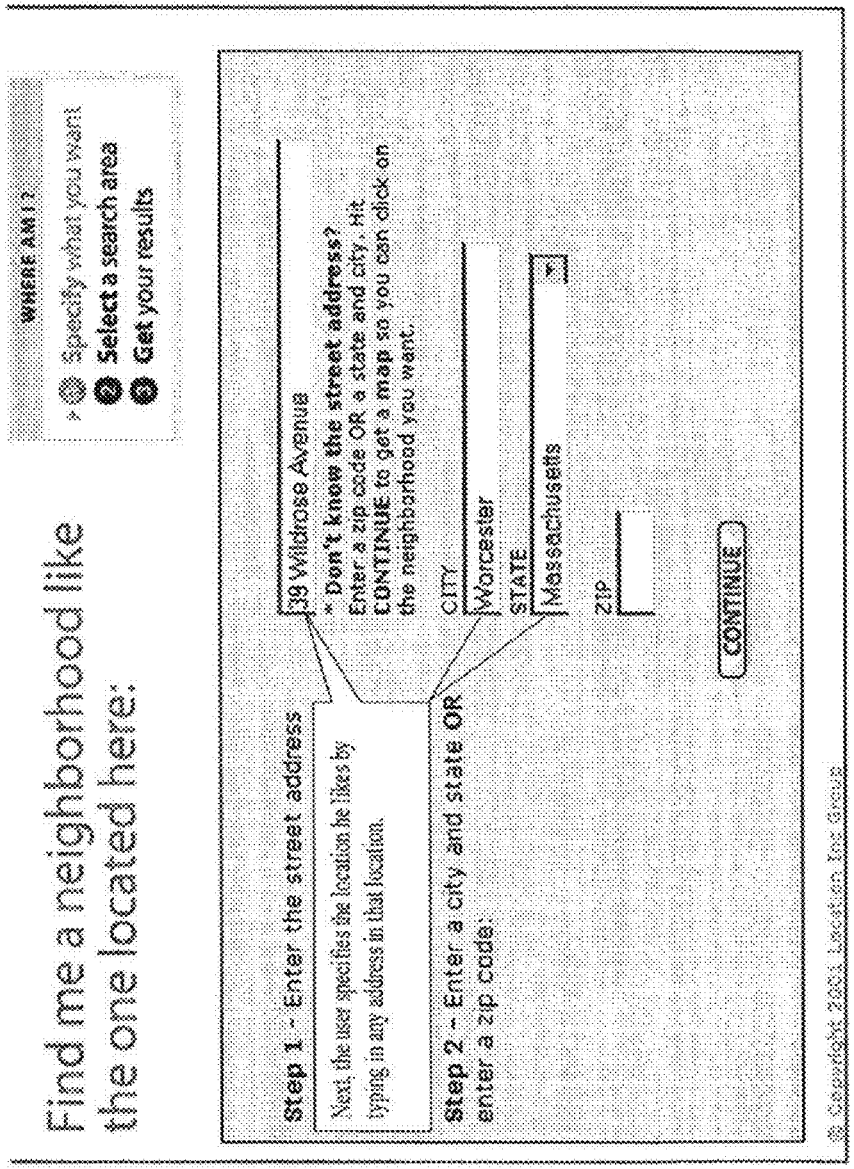
FIG. 3 is an interface wherein a user specifies the area in which to search for locations that best match the location the user likes.

Referring to FIG. 1, the user first chooses a method to find the best location for him. In the illustrated case, the user has chosen to match an existing neighborhood that the user likes. Next, the user specifies the location he likes by typing in any address in that location as shown in FIG. 2. Next, the user specifies the area in which to search for locations that best match the location the user likes (FIG. 3).

The search the user requested above is automatically completed by the system by searching a data base with the following structure:

TABLE 1

Example dissimilarity matrix.

|  | Location 1 | Location 2 | Location 3 | Location 4 |
|---|---|---|---|---|
| Location 1 | 0 | 38 | 2 | 109 |
| Location 2 |  | 0 | 11 | 6 |
| Location 3 |  |  | 0 | 1 |
| Location 4 |  |  |  | 0 |

Figure 4:
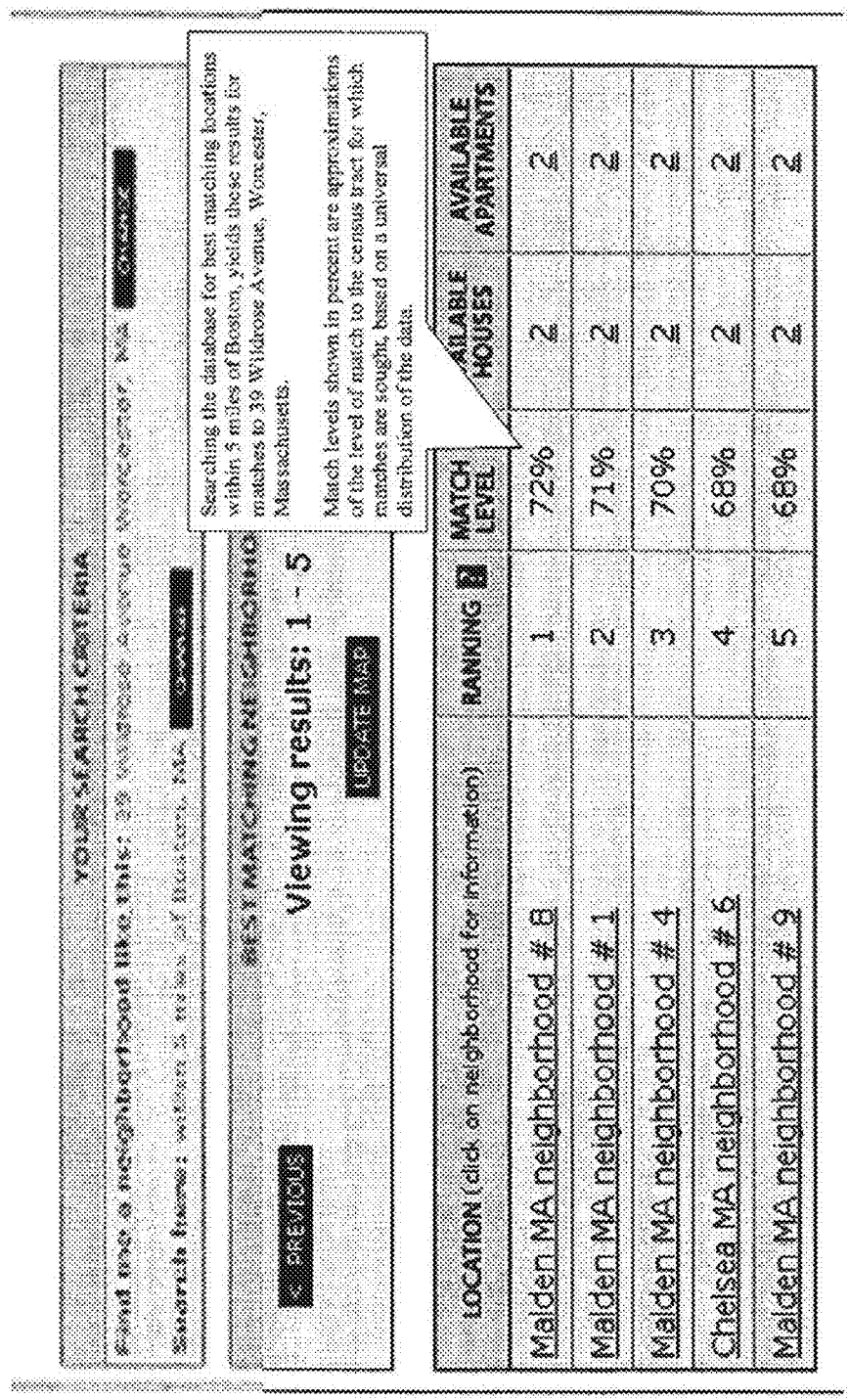
FIG. 4 is a matrix display depicting the best matches relative to the desired search.

Values between any two intersecting rows and columns represent the dissimilarity between the two locations labeled on the axes. Larger numbers denote larger difference. Smaller numbers denote smaller difference. Zero denotes either identity (the intersecting row and column represent the same location) or that two different locations are identical. To conduct the search the user specified above, only those locations within five miles of downtown Boston would be included, and then those locations with the smallest numbers between them and the location for which the user chose to find a match would be shown to the user as the ordered result of the user's search, and would be displayed to the user as shown in FIG. 4.

The dissimilarity values between locations, like in the example matrix shown in Table 1 are calculated as follows:

TABLE 1

Example dissimilarity matrix.

|  | Location 1 | Location 2 | Location 3 | Location 4 |
|---|---|---|---|---|
| Location 1 | 0 | 38 | 2 | 109 |
| Location 2 |  | 0 | 11 | 6 |
| Location 3 |  |  | 0 | 1 |
| Location 4 |  |  |  | 0 |

Step 1. Data are collected for nearly 200 characteristics for each location (in this case, census tract) in America.

Step 2. a factor analysis using Principal components as the extraction method is performed on the data (formula shown in A). This rids the raw data of multicolinearity, and simultaneously serves to standardize all values.

A. The principal component factor analysis of the correlation matrix R is specified in terms of its eigenvalue-eigenvector pairs, $$\left(\frac{\Omega}{\lambda_1}, \frac{\Omega}{\lambda_1}\right), \left(\frac{\Omega}{\lambda_2}, \frac{\Omega}{\lambda_2}\right), \ldots, \left(\frac{\Omega}{\lambda_N}, \frac{\Omega}{\lambda_N}\right),$$

where $$\frac{\Omega}{\lambda_1} \geq \frac{\Omega}{\lambda_2} \geq \ldots \geq \frac{\Omega}{\lambda_\gamma}.$$

And where m<p is the number of common factors, and p is the total number of original variables (in this case 26 sustainable development indicators).

The estimated specific variances are provided by the diagonal elements of the matrix.

$R - \tilde{L}\tilde{L}'$, such that $$\tilde{\psi} = \begin{bmatrix} \tilde{\psi}_1 & 0 & \ldots & 0 \\ 0 & \tilde{\psi}_2 & \ldots & 0 \\ \vdots & \vdots & \ddots & \vdots \\ 0 & 0 & \ldots & \tilde{\psi}_\gamma \end{bmatrix} \text{ with } \tilde{\psi}_i = R_{ii} - \sum_{j=1}^{m} \tilde{l}_{ij}^2 \text{ for } ith \text{ variable, } jth \text{ factor.}$$

Communalities are estimated as $\tilde{h}_i^2 = \tilde{l}_{i1}^2 + \tilde{l}_{i2}^2 + \ldots + \tilde{l}_{im}^2$ Step 3. The number of factors extracted is set to capture 95% of the total variance contained in the original data.

Step 4. The extracted factors are saved in the data base, thus there are factor scores for each census tract for every factor.

Step 5. The saved factors scores for every census tract in America are input to the formula in B to calculate a dissimilarity matrix containing all census tracts.

This results in a "distance" matrix or dissimilarity matrix showing a mathematical calculation of the similarity or dissimilarity of every census tract in America, to every other census tract in America.

B. A dissimilarity matrix for the census tracts is calculated based on squared Euclidean distance across factor values for each of the census tracts in America, such that:

$$d_{ij} = \sum_k (x_{ik} - x_{jk})^2$$

where d=distance, and $x_{ik}$=value of factor k for census tract i.

What is unique here is the application of first the factor analysis, and then the squared Euclidean distance measure to resultant factors that are composed of geographic, school, crime, and demographic data describing locations in America, such that a true measure of similarity between all included locations is derived. That this is applied to geographic location to find similarity is unique, it should not be limited to the notion of census tracts only. The result of this unique combination of statistics and mathematics to this type of data is a way for people to specify a location they like, and then automatically search the database to find best matching locations in any part of the country in which the user has an interest, resulting in an automatically generated ordered list of the best matching locations. It is this combination of known elements that is the first unique element in this product.

Searching the database for best matching locations within 5 miles of Boston, yields these results shown in FIG. 4 for matches to 39 Wildrose Avenue, Worcester, Mass. Match levels shown in percentages are approximations of the level of match to the census tract for which matches are sought, based on a universal distribution of the data.

Figure 5:
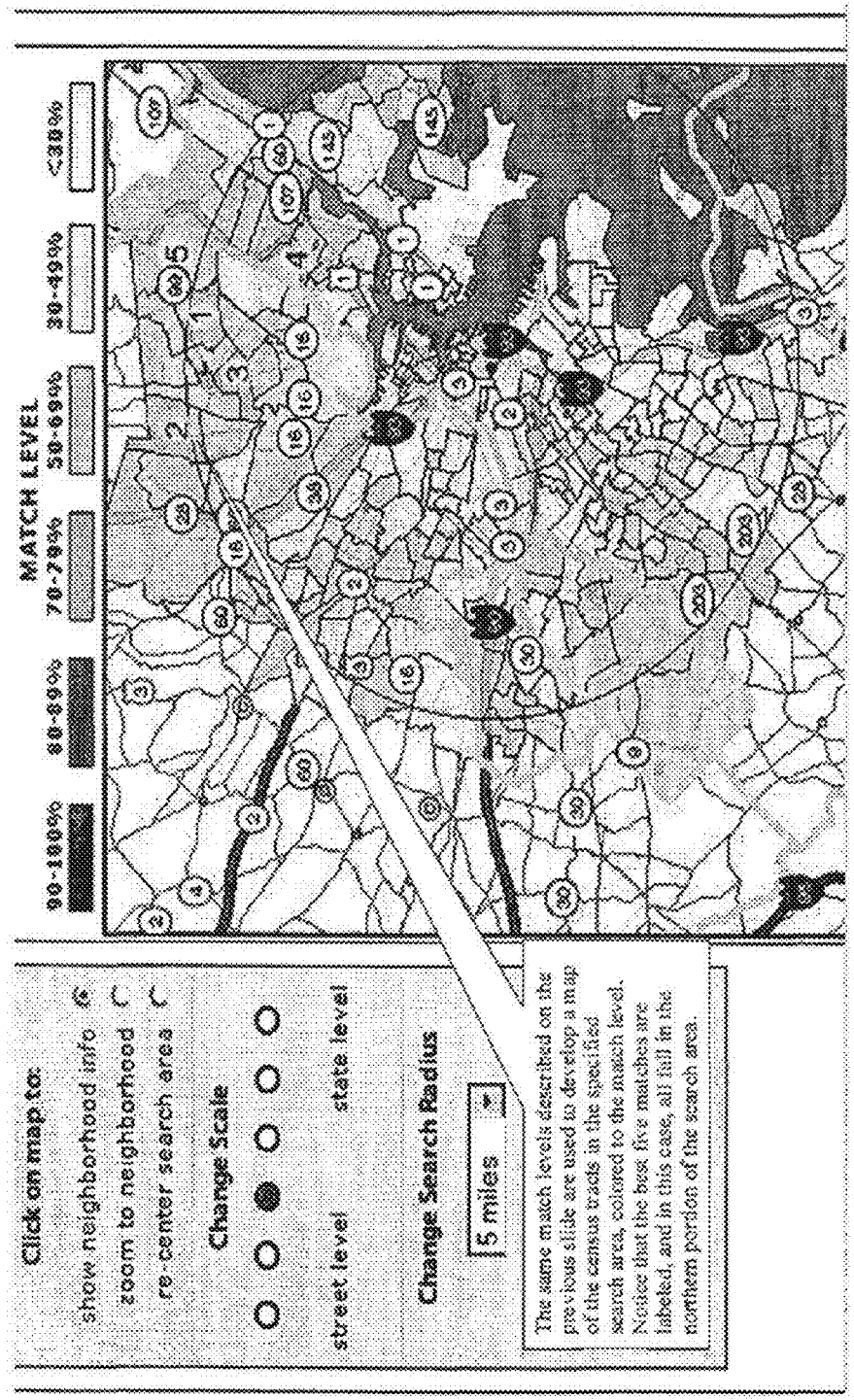
FIG. 5 is a map graphically depicting the results found in FIG. 4.
Figure 6:
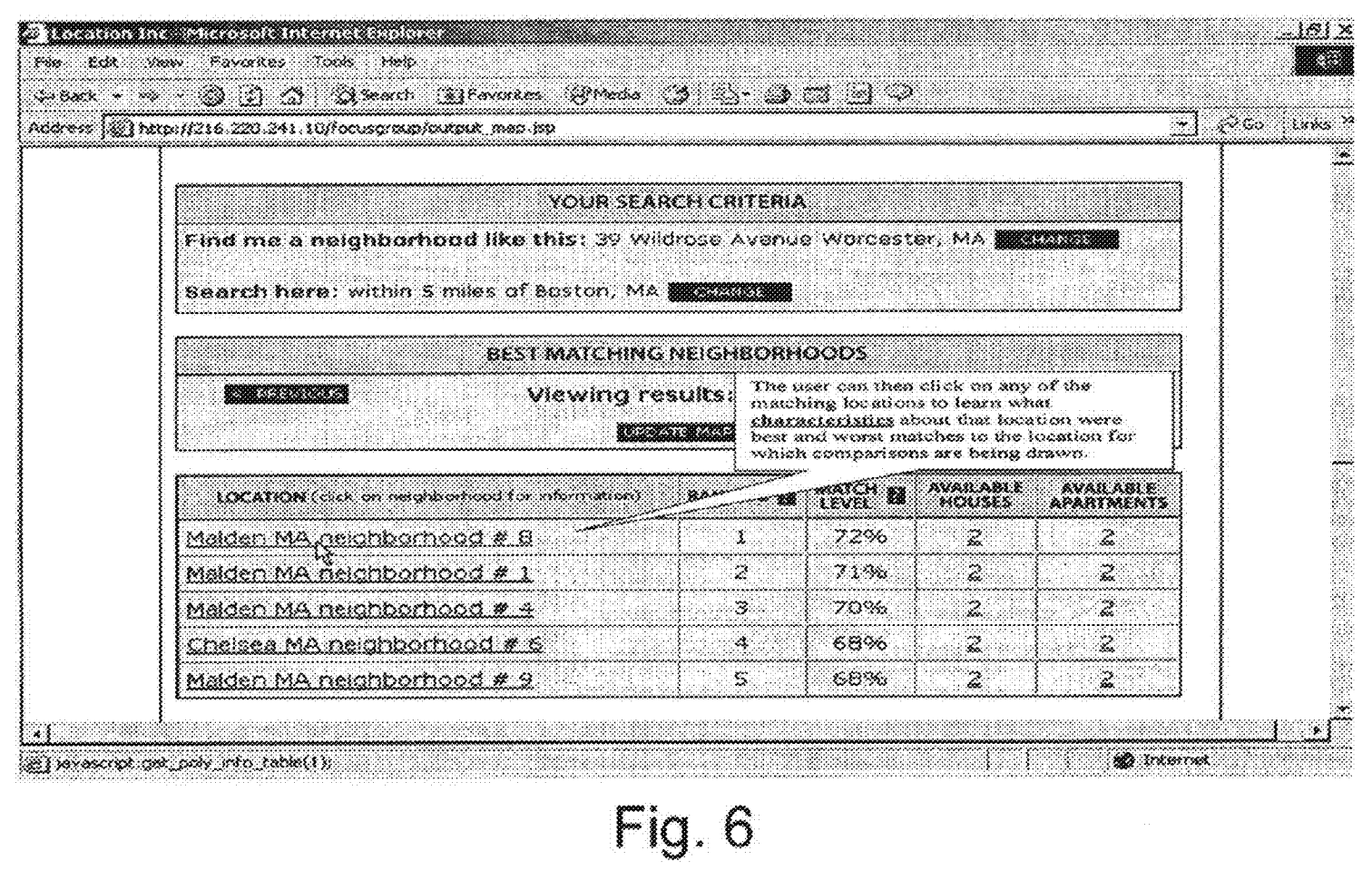

Referring to FIG. 5, in another aspect of the invention the same match levels described FIG. 4 are used to develop a map of the census tracts in the specified search area, colored to the match level. Notice that the best five matches are labeled, and in this case, all fall in the northern portion of the search area. Referring to FIG. 6, the user can then click on any of the matching locations to learn what characteristics about each location are the best and worst matches to the location for which comparison is being drawn. For example, Table 2 below compares categorized characteristics (e.g., cost of housing or school quality) of the selected census tract to categorized characteristics of the census tract for which matches were requested. This allows the user to see at a glance what the characteristics are of the matching census tract, and also to learn which characteristics are the best and worst matches between the two census tracts. Here we see that cost is quite similar (90%) match), but that public school quality and crime rate are quite dissimilar (60% match for each).

TABLE 2

Neighborhood comparison table

| Malden, MA neighborhood #8 | Worcester, MA neighborhood #8 |
|---|---|
| Neighborhood Cost | 90% |
| High Cost | High Cost |
| Relative to the Nation | Relative to the Nation |
| Medium Cost | Low Cost |
| Relative to MA | Relative to MA |
| Public Schools | 60% |
| School quality: 7 (10 is best) | School quality: 3 (10 is best) |
| Crime Rate | 60% |
| Crime rate: 8 (10 is least crime) | Crime rate: 4 (10 is least crime) |

Table 3 below, which can be selected by the user, is a continuation of the breakdown of the categories of characteristics, and how well they match the census tract for which matches were sought. These calculations for matches by category are based on the average absolute difference between rank percent values for all characteristics in each category. This calculation is explained on the next slide.

TABLE 3

Neighborhood Look & Feel
The Buildings

| | |
|---|---|
| Age | 72% |
| Mostly established, but not old. Some well established older homes. Some historic homes. Some newer homes | Mostly well established older homes. Some established, but not old. Some historic homes. Some newer homes. |
| Size | 6% |
| Mostly small dwellings. Some medium-sized dwellings. Some large dwellings | Mostly medium-sized dwellings. Some small dwellings. Some large dwellings. |
| Type | 81% |
| Mostly small apartment buildings. Some complexes/high rise apartments. Some rowhouses & attached homes. Some single-family homes. | Mostly complexes/high rise apartments. Some small apartment buildings. Some single-family homes. Some rowhouses & attached homes. |
| Ownership | 46% |
| Mostly renters | Mixed owners & renters |

Overall matches for one census tract to the other are calculated as set forth previously. However, matches for different categories of characteristics within the census tracts—to show the user what elements of the census tracts are the best and worst matches to the census tract the user wishes to match—such as age or type of homes—are based on the average absolute difference between rank percent values for each characteristic in any category. This approach and calculation are outlined below.

Step 1. Rank percent scores are calculated for each characteristic, as shown in C, and saved in the data base.

For ranking, ties are assigned the highest value, and the first rank is assigned a value of 0. This serves to curve the values for each characteristic, such that the rank percent values show the percentage of census tracts in America that are better matches to that specific characteristic than the current census tract (e.g., a rank percent score of 10.5 means that 10.5 percent of the census tracts in America had higher scores for that characteristic than the current census tract).

C. Rank percent=(k/N)*100

Where k is assigned rank from 1 ... N, and N is the total number of cases (census tracts).

Step 2. The average absolute difference between any category of characteristics (e.g., types of housing) for any two census tracts is calculated on demand, as shown in D. Only the characteristics within each category are included for this calculation (e.g., for types of housing this would be the average absolute difference in rank percent scores between two compared census tracts for these categories: detached single family homes, small apartment buildings, big apartment buildings, townhouses or other attached homes, and mobile homes). As the value inflates for this category, the match for housing type between the two census tracts is shown to be less good. Lastly, the results of the calculation in D are subtracted from 100, so a value of 10 becomes a 90% match. See the previous slide for an example.

$$D. \quad M_{cc}Z = M_{cc}Z = \sum_{k} ABS(x_{ik} - x_{jk})/n$$

where $M_{cc}Z$=match level for characteristic category Z, $X_{ik}$=value of rank percent score k for census tract I, and n=the number of k characteristics in characteristic category Z.

Figure 7:
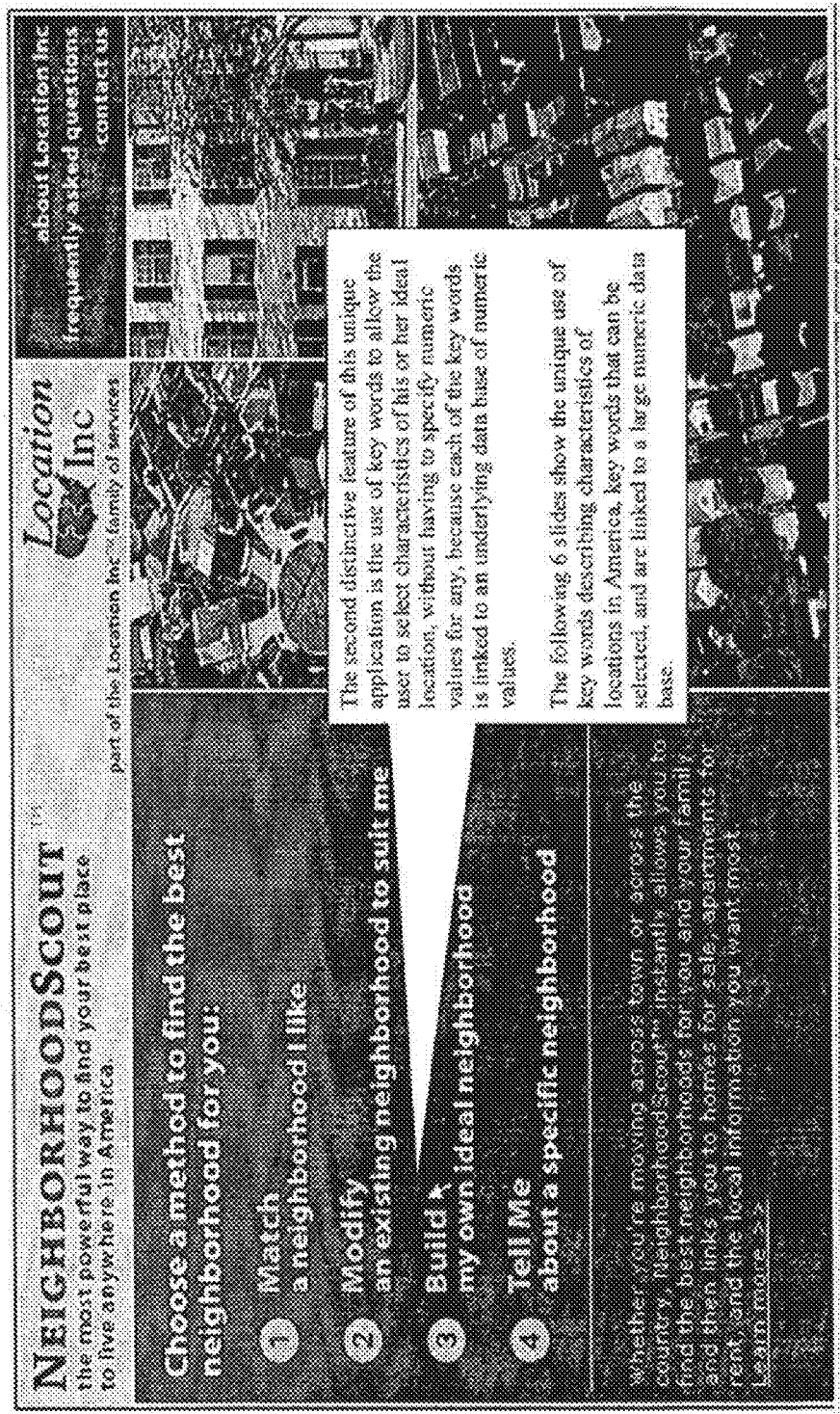
FIG. 7 is an interface that allows a user to employ a keyword search in desired categories.
Figure 8:
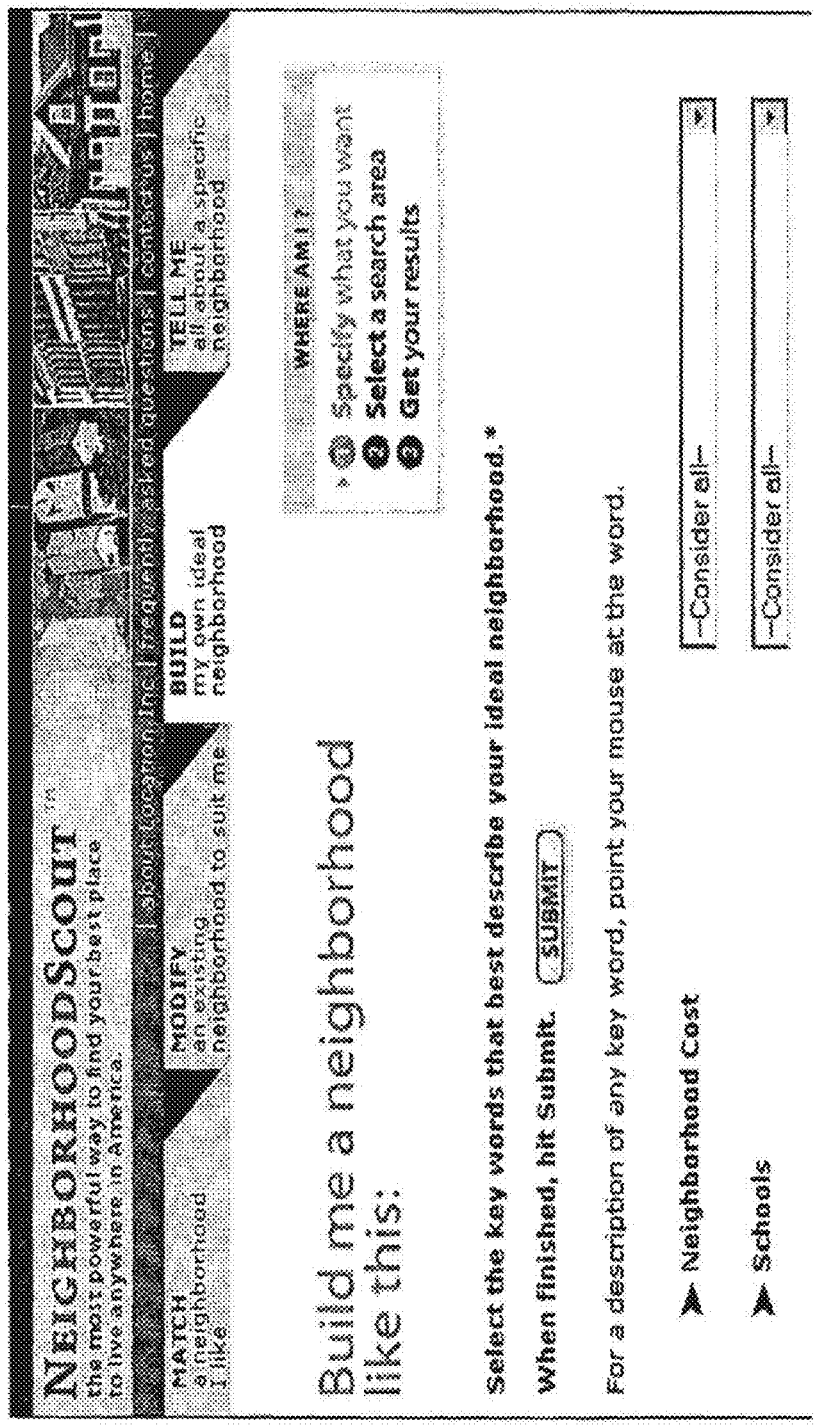
Figure 9:
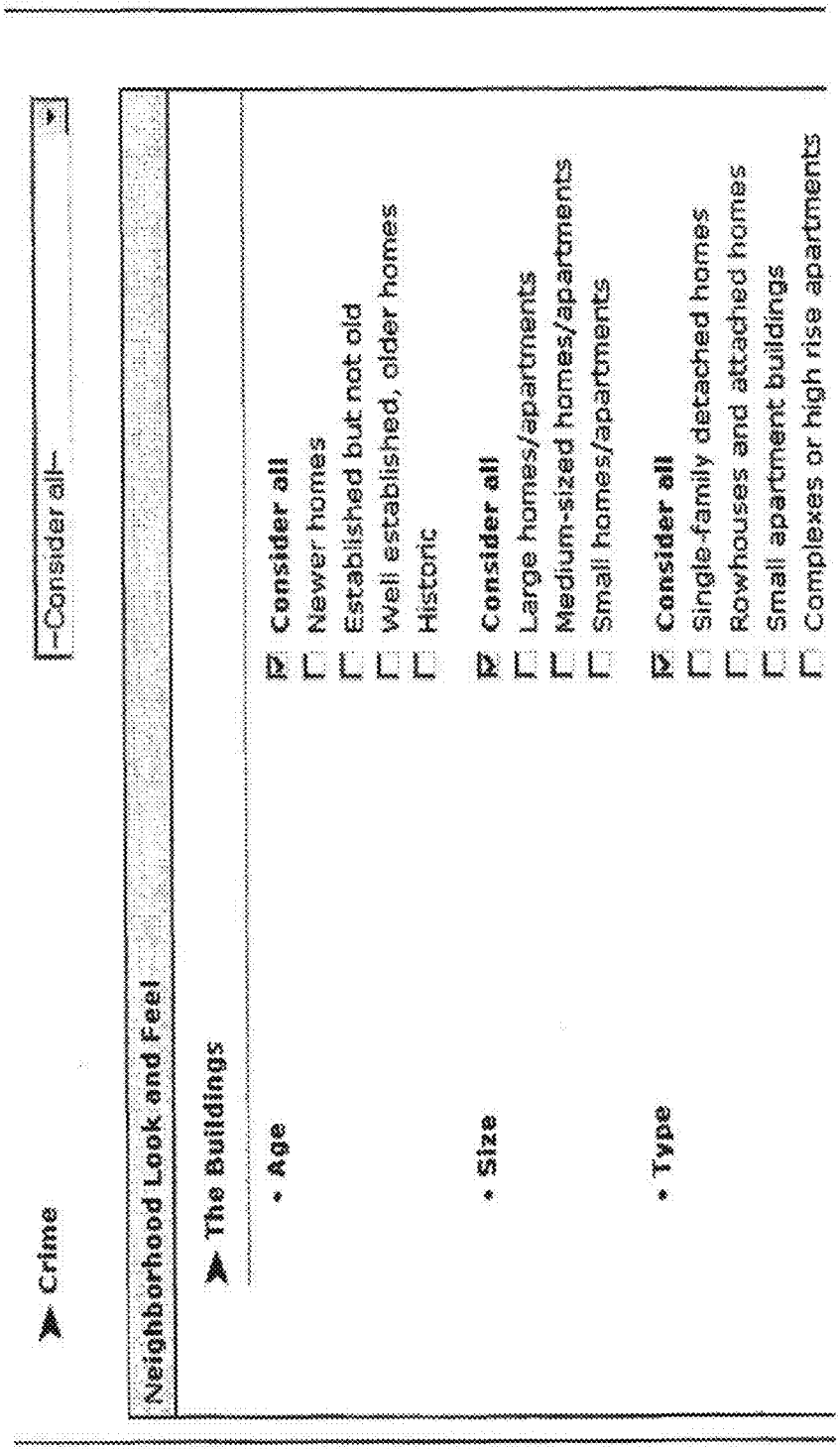
Figure 10:
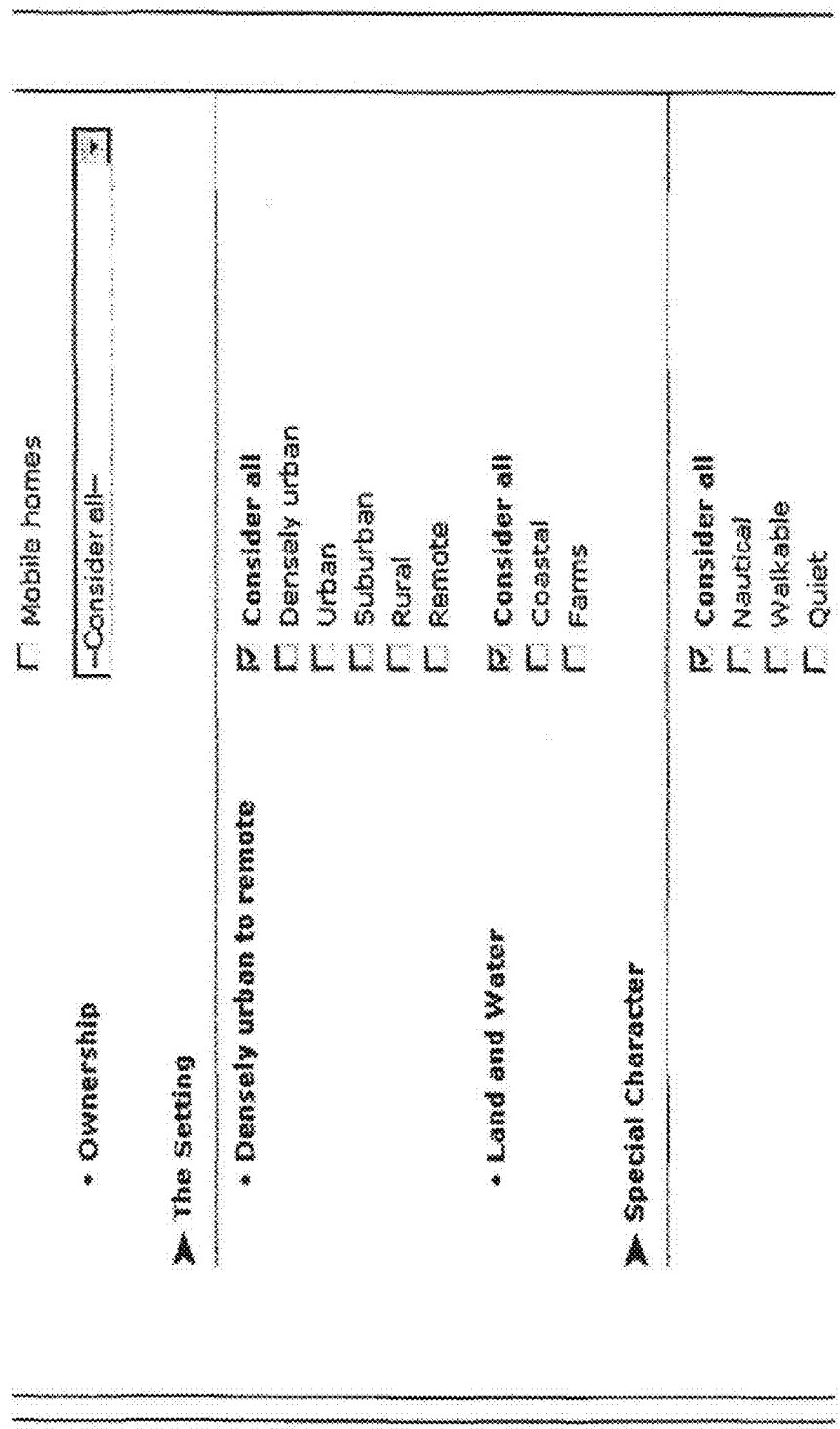
Figure 11:
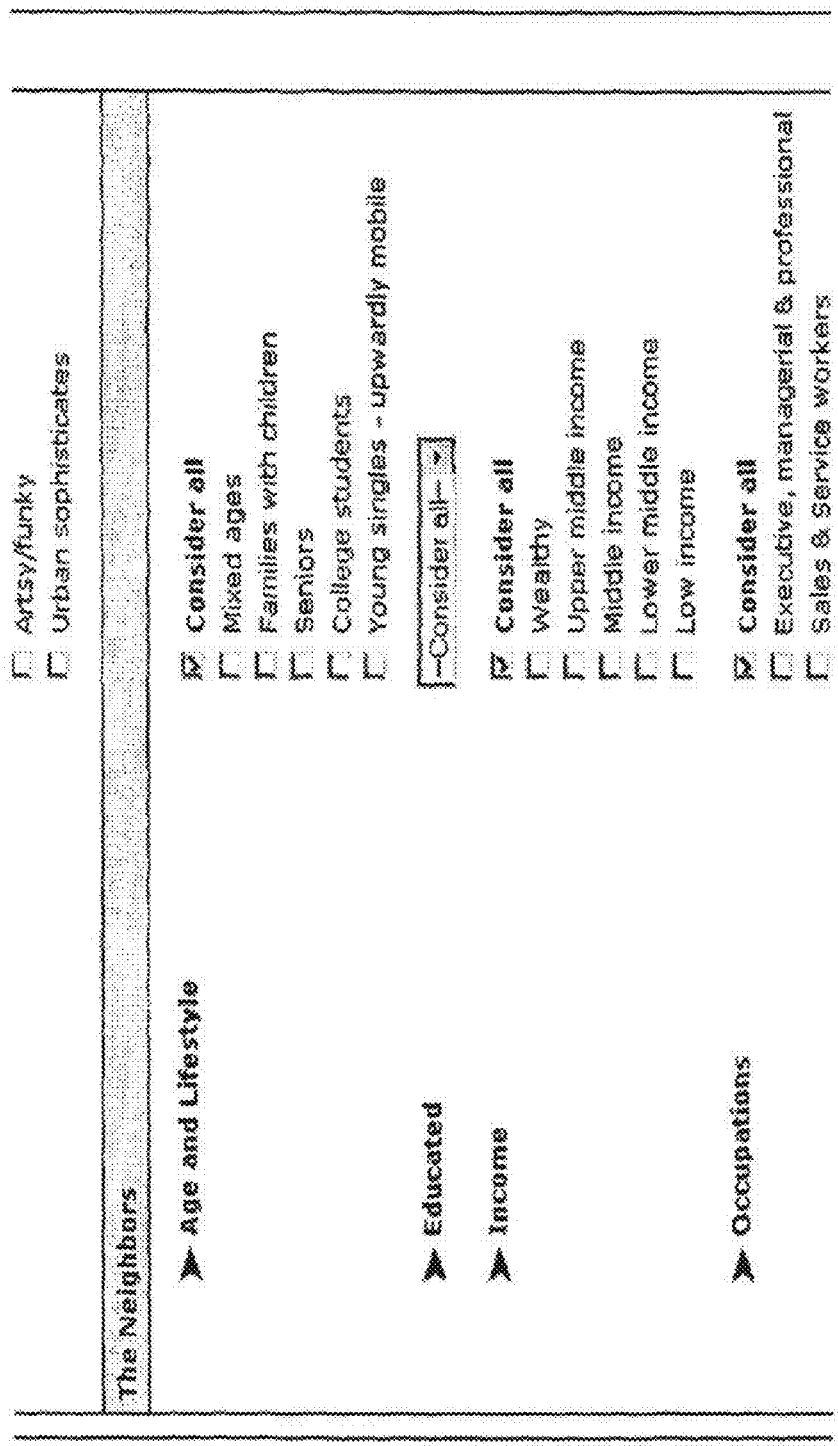
Figure 12:
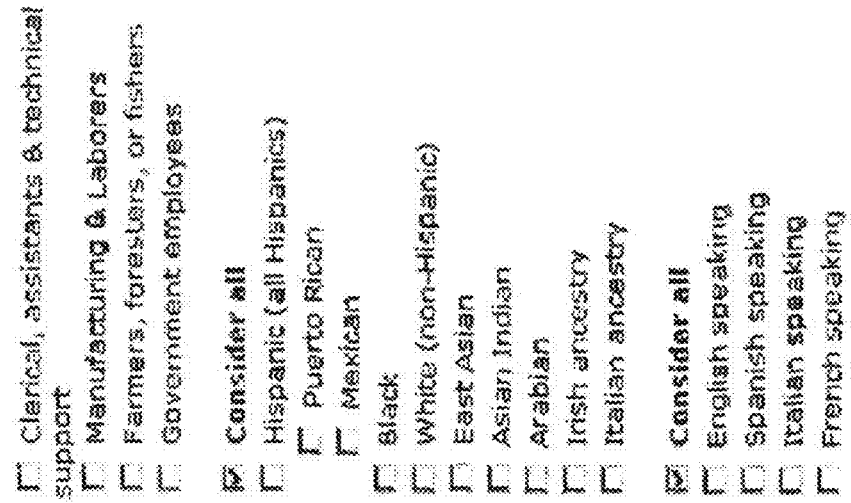

Turning now to FIG. 7, a second distinctive feature of this unique application is the use of key words to allow the user to select characteristics of his or her ideal location, without having to specify numeric values for any, because each of the key words is linked to an underlying data base of numeric values.

FIGS. 8-13 show the unique use of key words describing characteristics of locations in America, key words that can be selected, and are linked to a large numeric data base.

This use of key words is the second distinctive component of this application. As illustrated in preceding slides, these key words describe features and characteristics of locations, where each key word is linked to quantitative values in an underlying data base. This unique approach allows users of the application to select these easy to understand key words to choose what characteristics they wish to have in a location, and then ask the application to find and order locations that most closely match those chosen characteristics.

Using key words that describe locations linked to quantitative values in a data base means users never have to think in quantitative terms, but can still request to find those locations that have characteristics they want. It is a revolutionary and simple way for users to find the locations that best match their own personal criteria. This is a unique application of key words to geographic, demographic, school, and crime information to describe and find best matching geographic locations.

Figure 14:
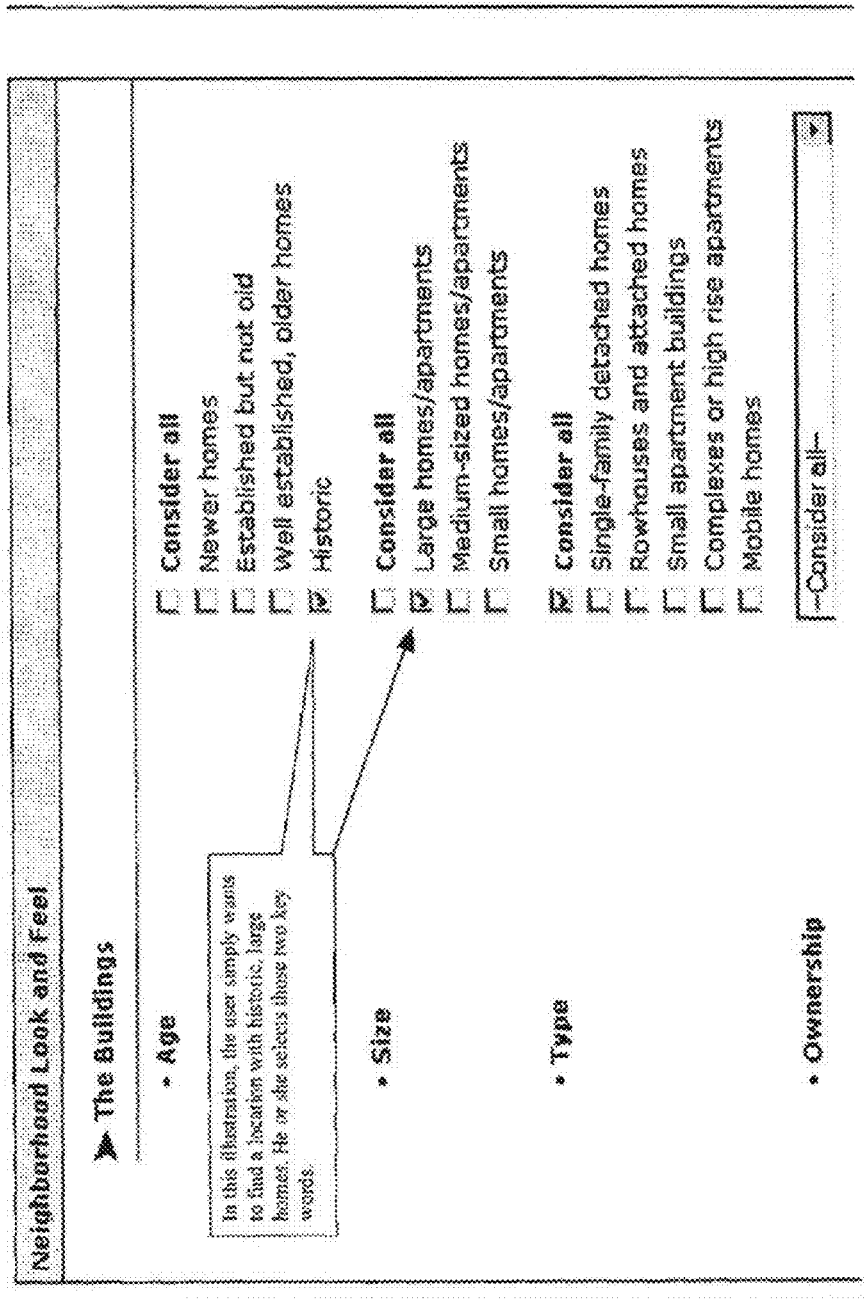
Figure 15:
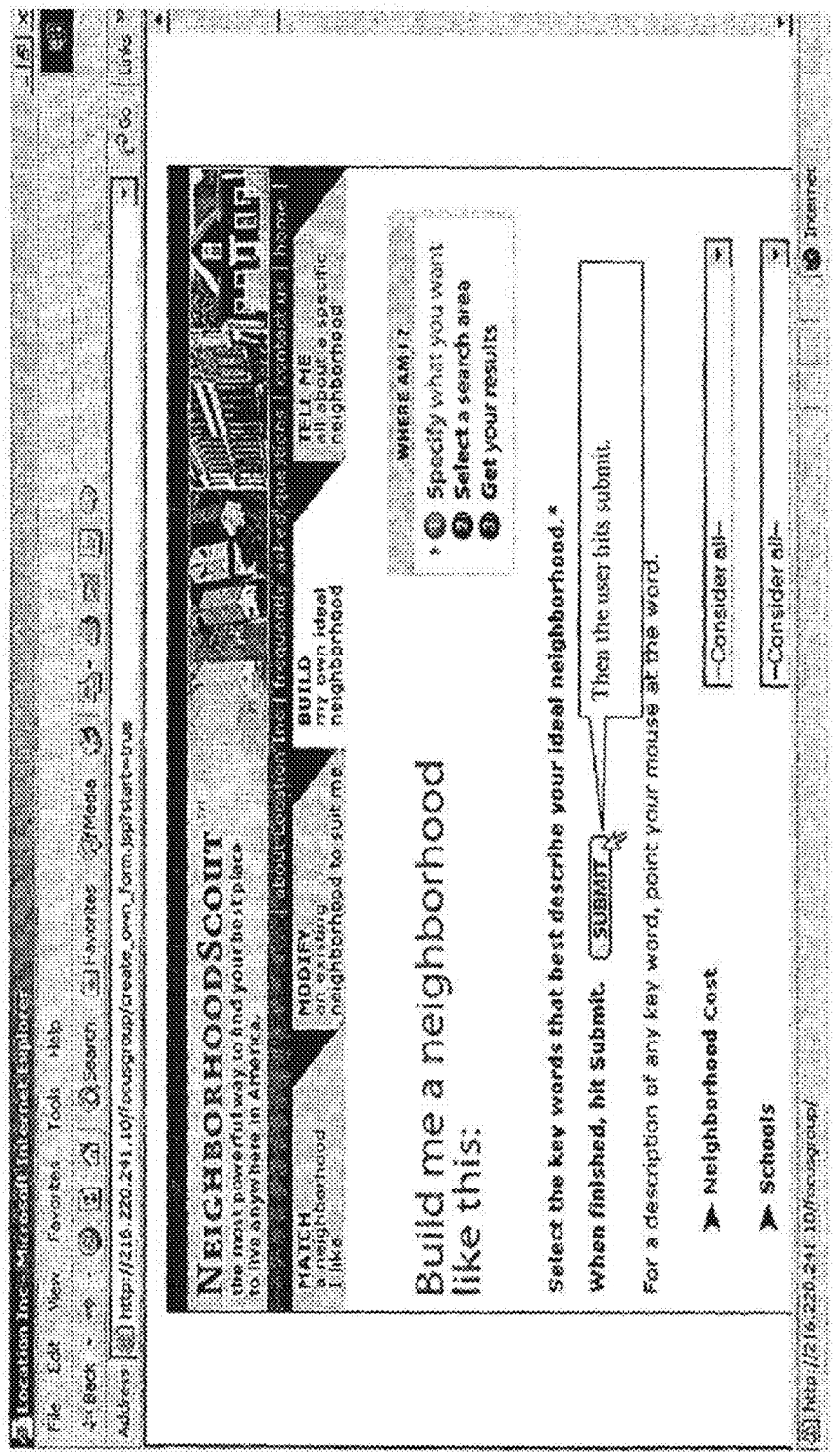
Figure 16:
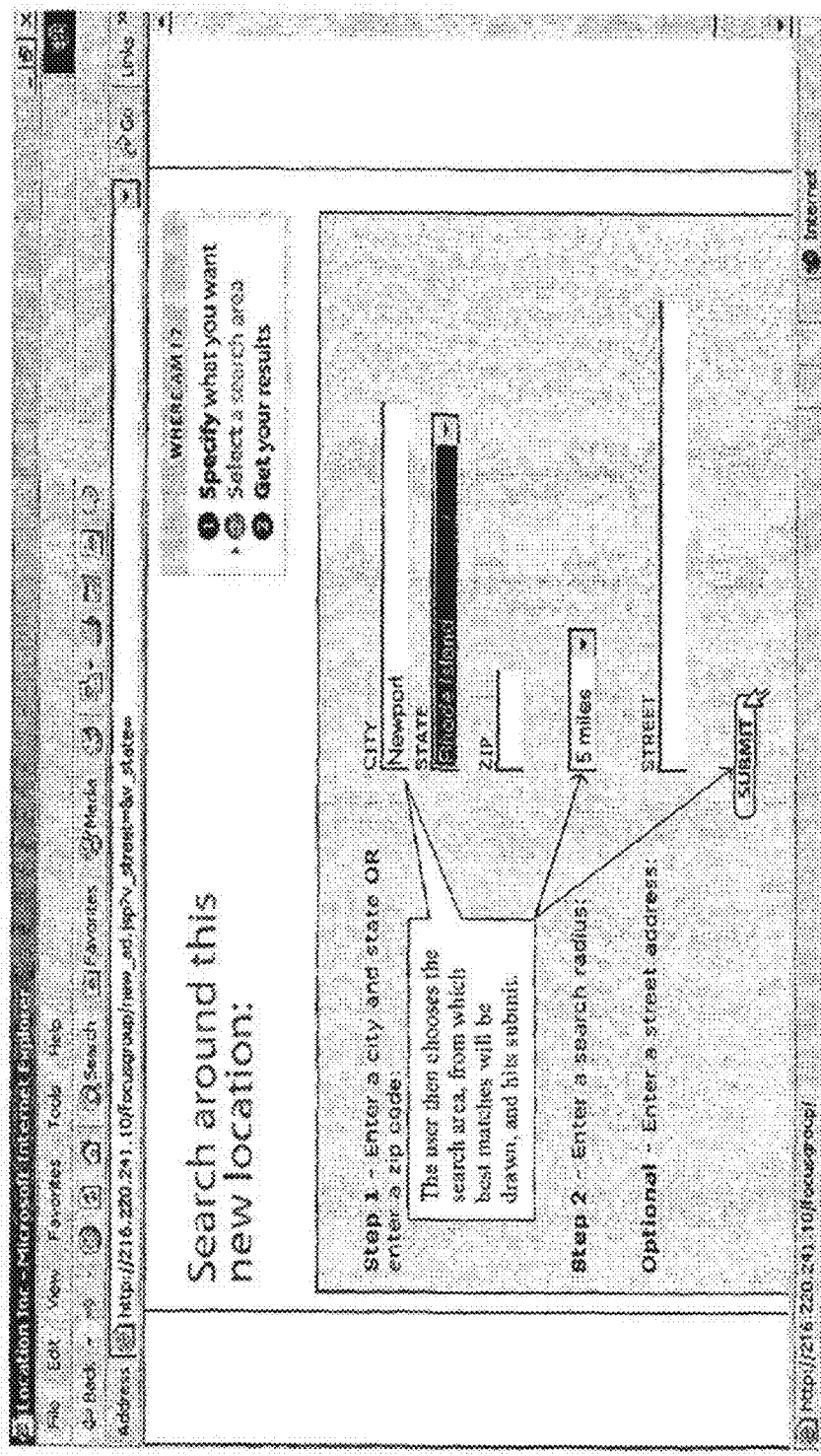

In another aspect of the invention, FIGS. 14-16 below is an illustration and description of how matches are determined between combinations of selected key words, and real locations. In this illustration, the user simply wants to find a location with historic, large homes. He or she selects those two key words and hits submit (FIG. 15). The user then chooses the search area, from which best matches will be drawn, and hits submit (FIG. 16).

Best matching locations are automatically calculated as follows, based on the two key words selected:

Step 1. Rank percent scores are calculated for each characteristic, as shown in E, and saved in the data base ahead of time. When the user requests a query, these values are already to go.

E. Rank percent=(k/N)*100

Where k is assigned rank from 1 ... N, and N is the total number of cases (census tracts).

To calculate rank percent scores, ties are assigned the highest value, and the first rank is assigned a value of 0. This serves to curve the values for each characteristic, such that the rank percent values show the percentage of census tracts in America that are better matches to that specific characteristic than the current census tract (e.g., a rank percent score of 10.5 means that 10.5 percent of the census tracts in America had higher scores for that characteristic than the current census tract).

Step 2. The average absolute difference between the best rank percent score possible for each selected key word and the rank percent score for each of these same key words for every census tract in the search area is calculated. **A zero is always the best rank percent score possible, because this means that zero percent of the census tracts in America have a better score for that key word. This calculation is shown in F. Lastly, the results of the calculation in F are subtracted from 100, so a value of 10 is represented as a 90% match.

$$F. \quad MkwZ = \sum_k (x_{kk} - x_{jk})/n$$

where $M_{kw}z$=a location's average match level to the best score possible for all selected key words, $X_{jk}$=value of the rank percent score for key word k for location l, $X_{hk}$=the lowest possible value for key word k (always zero), and n=the number of k key words selected.

In this example, the user has chosen historic homes, and large homes. The user then chose to search within five miles of Newport, R.I. Matches were calculated as described and are presented on the screen as shown in FIG. 17, and the two top matching locations to the selected set of key words are shown here. As can be seen, the best matching location is an 82% match to the selected key words. As described above, the user can then click on the locations to find out which key words best and least matched. As shown in FIG. 18, the selected location in Newport, R.I. was an 83% match to the key word "historic homes," and an 82% match to the key word "large dwellings." This means that this location has a greater proportion of homes characterized as historic than 83% of the census tracts in America, and this location has a greater proportion of large homes than 82% of the census tracts in America.

In on embodiment as shown in Table 3 are listed in descending order the actual percentages of buildings in each class, while the matches are based on the percentages of census tracts in America that have fewer percentages of the types of buildings the user wishes to have in a location. Thus, the left hand column shows the user what to expect in the location (Newport, R.I., neighborhood #9), and the match level shows how this census tract falls relative to other census tracts in America in regards to the characteristics chosen by the user (historic homes and large homes).

TABLE 3

Neighborhood comparison table

| Newport, RI, neighborhood #9 | The key words you selected: |
|---|---|
| Neighborhood Look & Feel | |
| The Buildings | |
| Age | 83% |
| Mostly established, but not old. Some well established older homes. Some historic homes. Some newer homes | Historic homes |
| Size | 82% |
| Mostly medium-sized dwellings. Some small dwellings. Some large dwellings | Large dwellings |

Another characteristic of this new product is the ability given to the user to select a location they like, and then modify some characteristics of it by selecting or unselecting key words in a list, so that the location is more to the users liking. Then the modified version (modified search criteria) is quantitatively compared against real locations in a user-defined search area to automatically find and rank order best matches.

Figure 19:
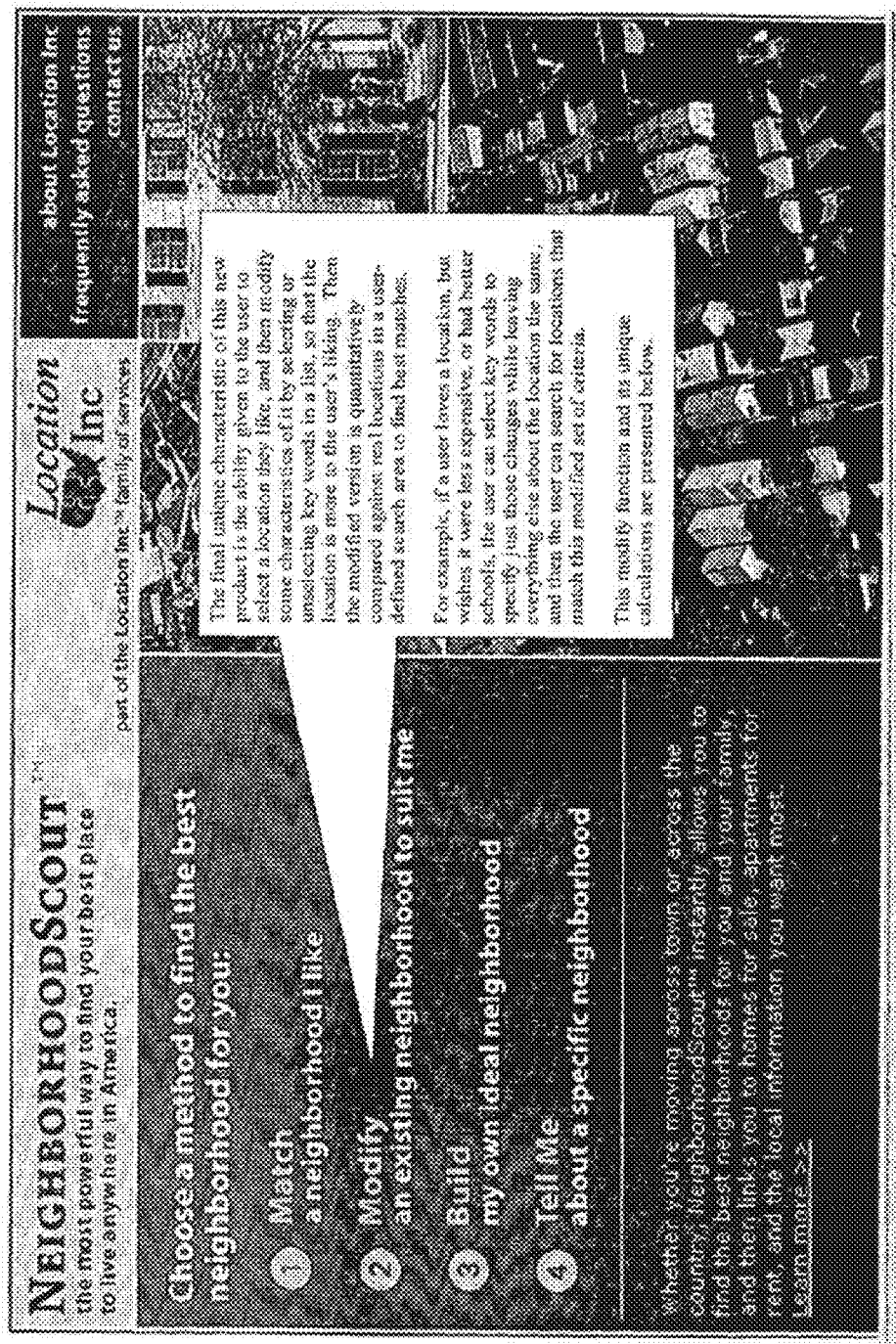
Figure 20:
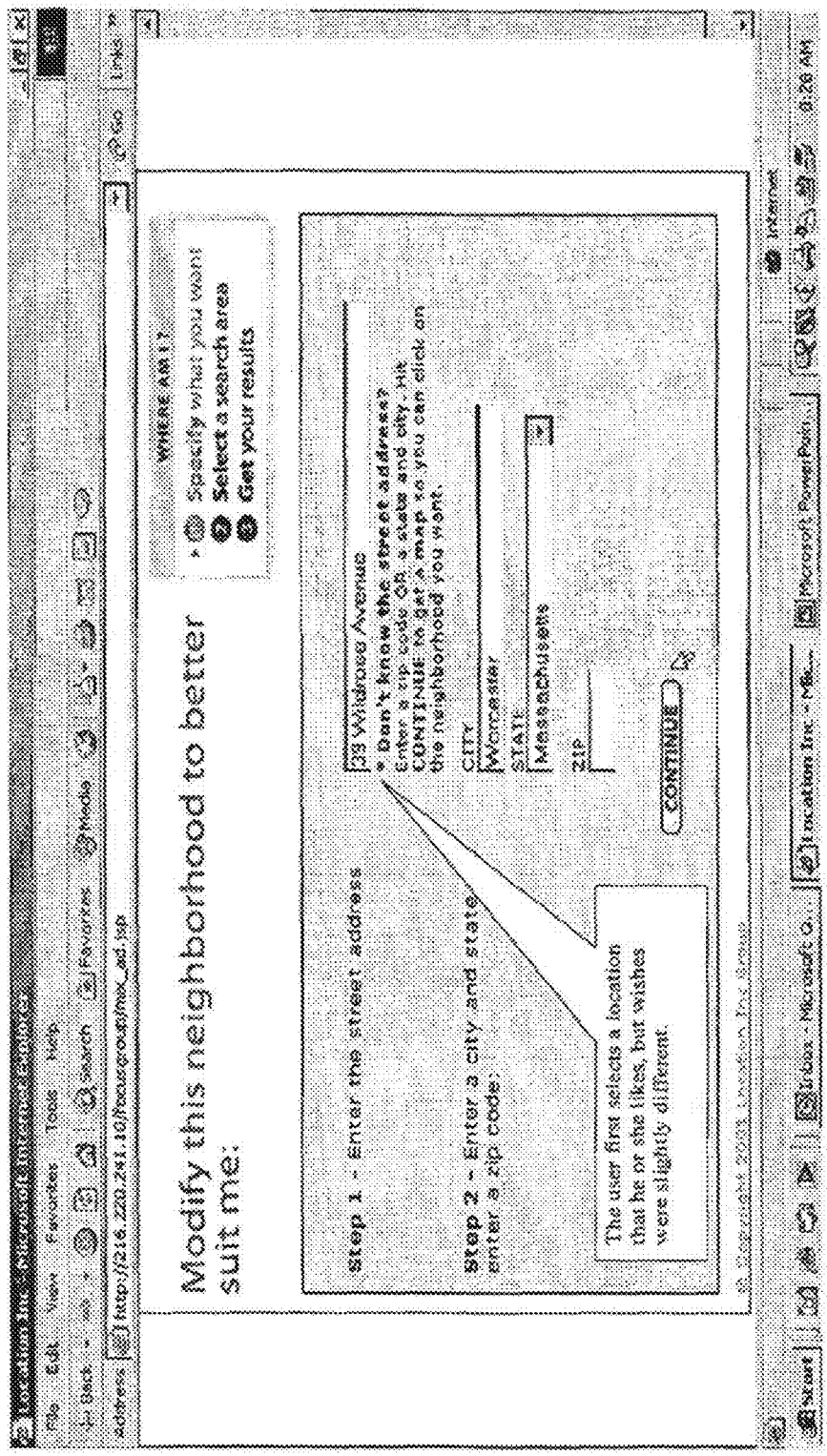
Figure 21:
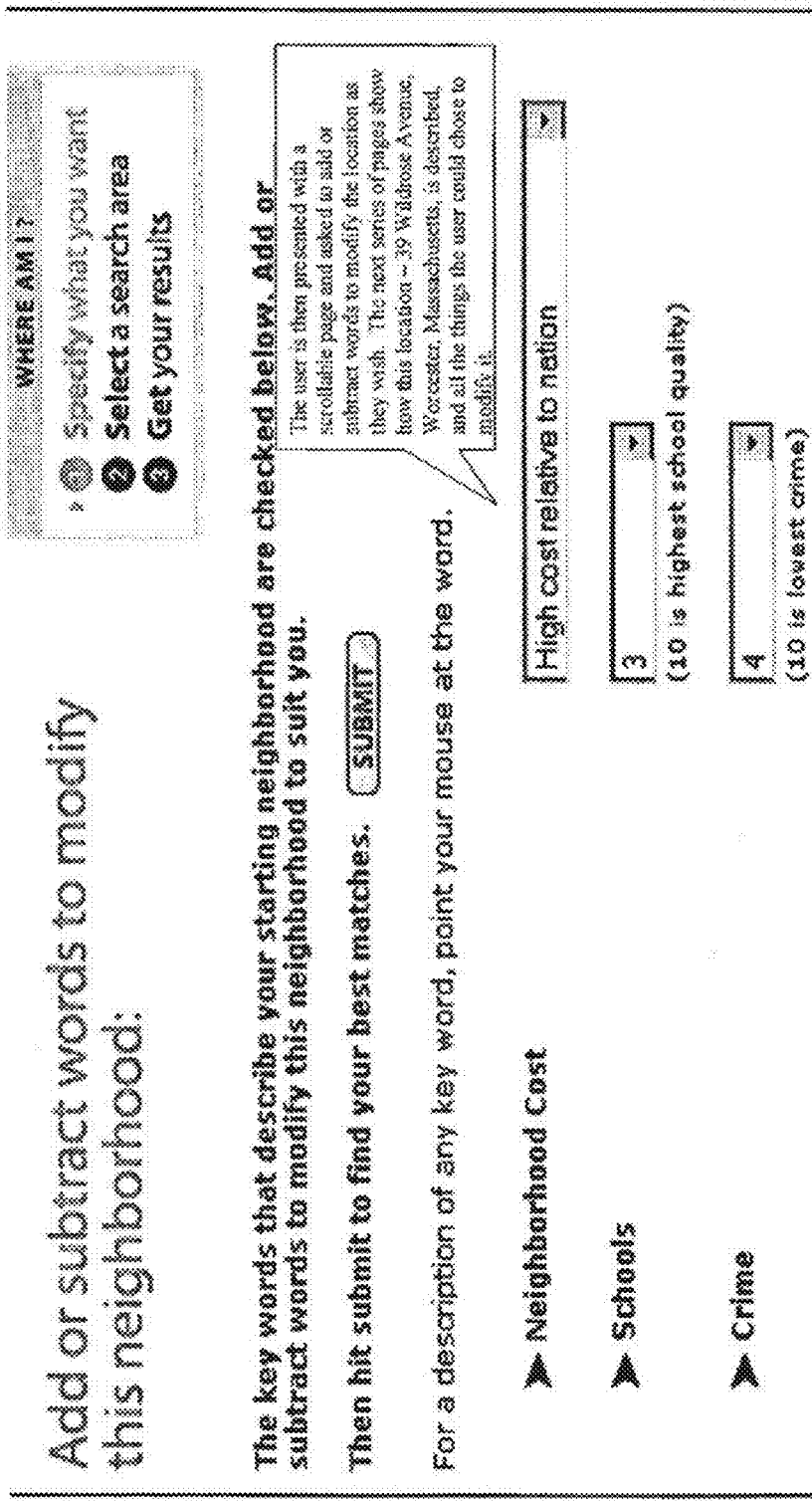
Figure 24:
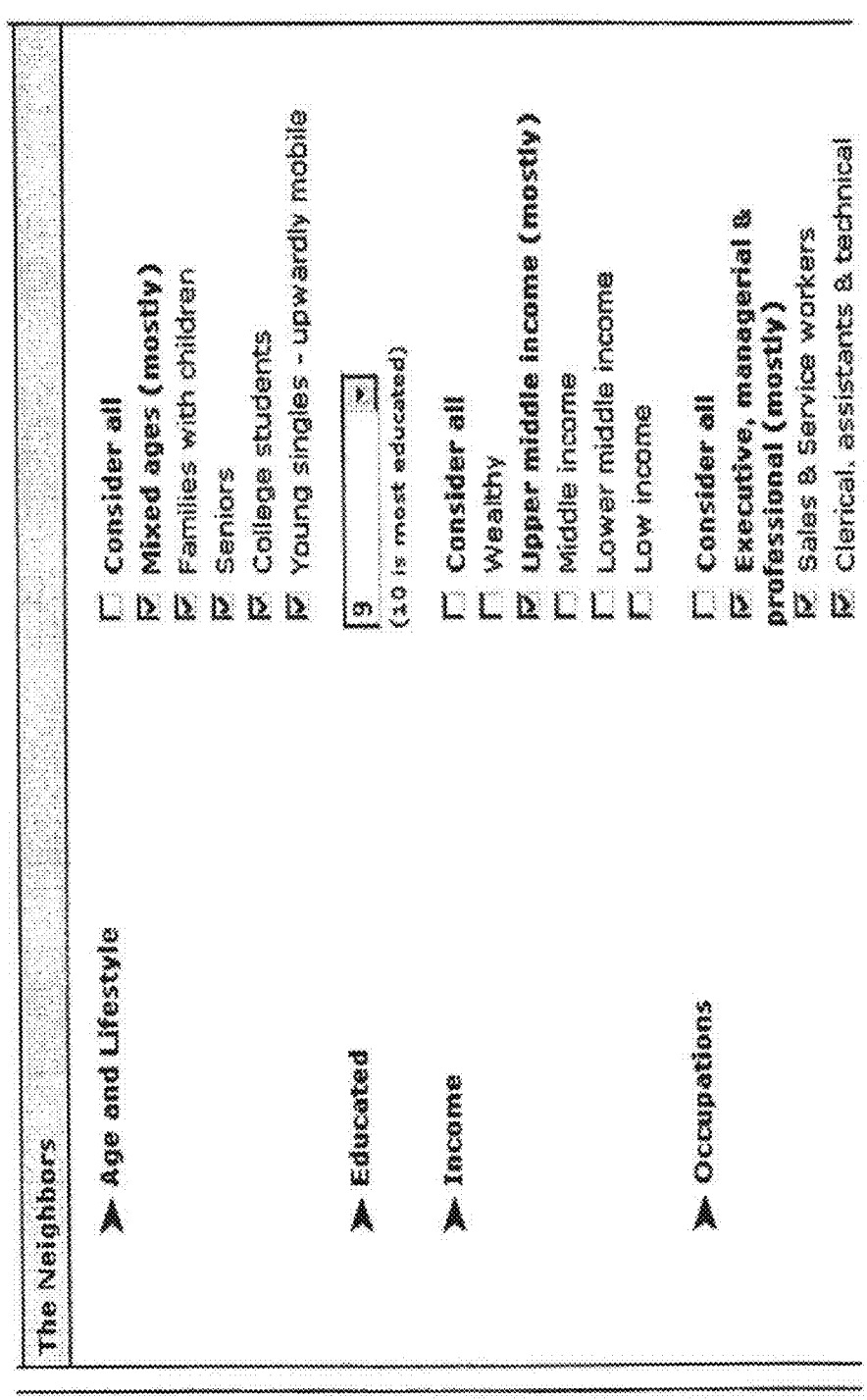
Figure 26:
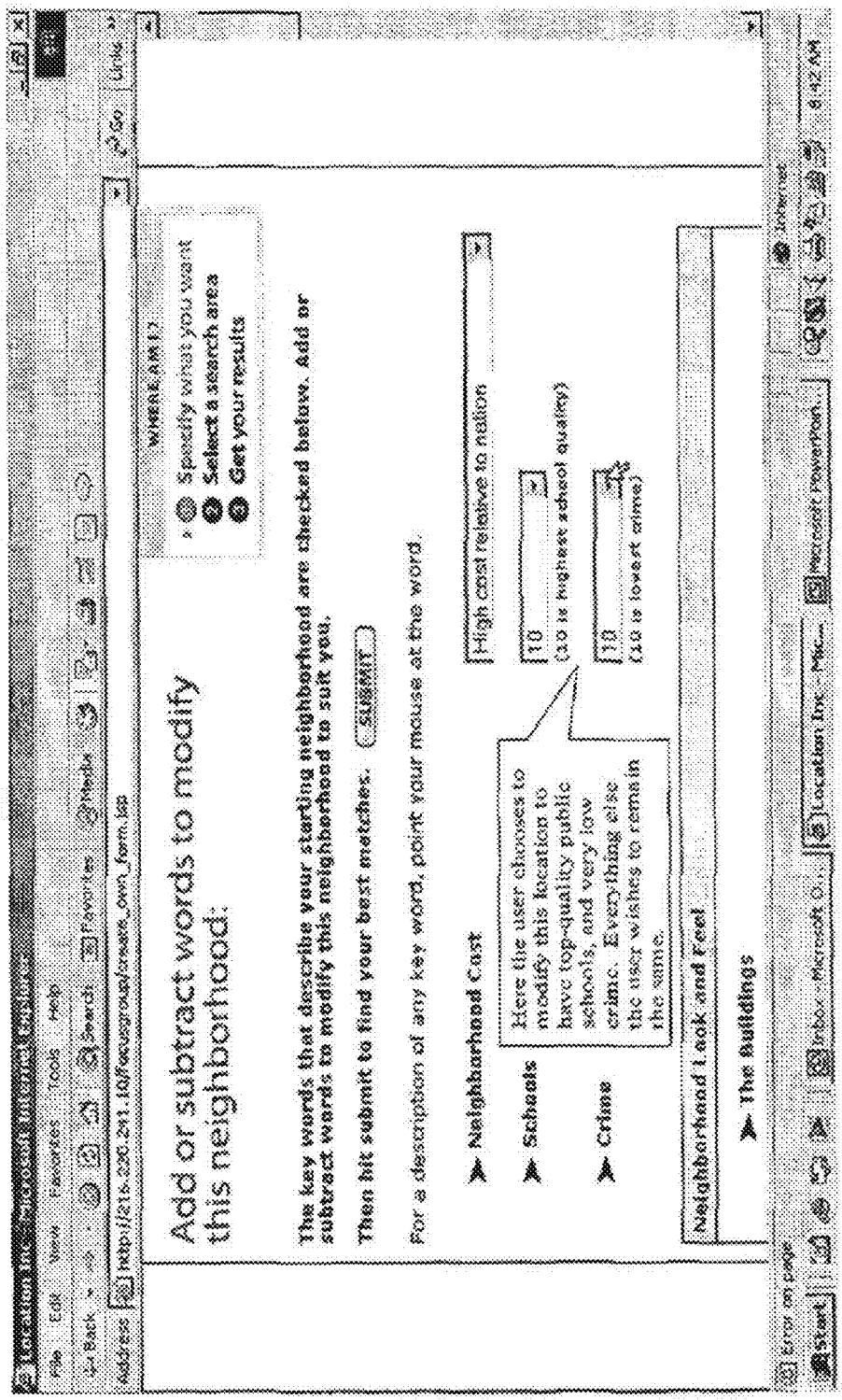
Figure 27:
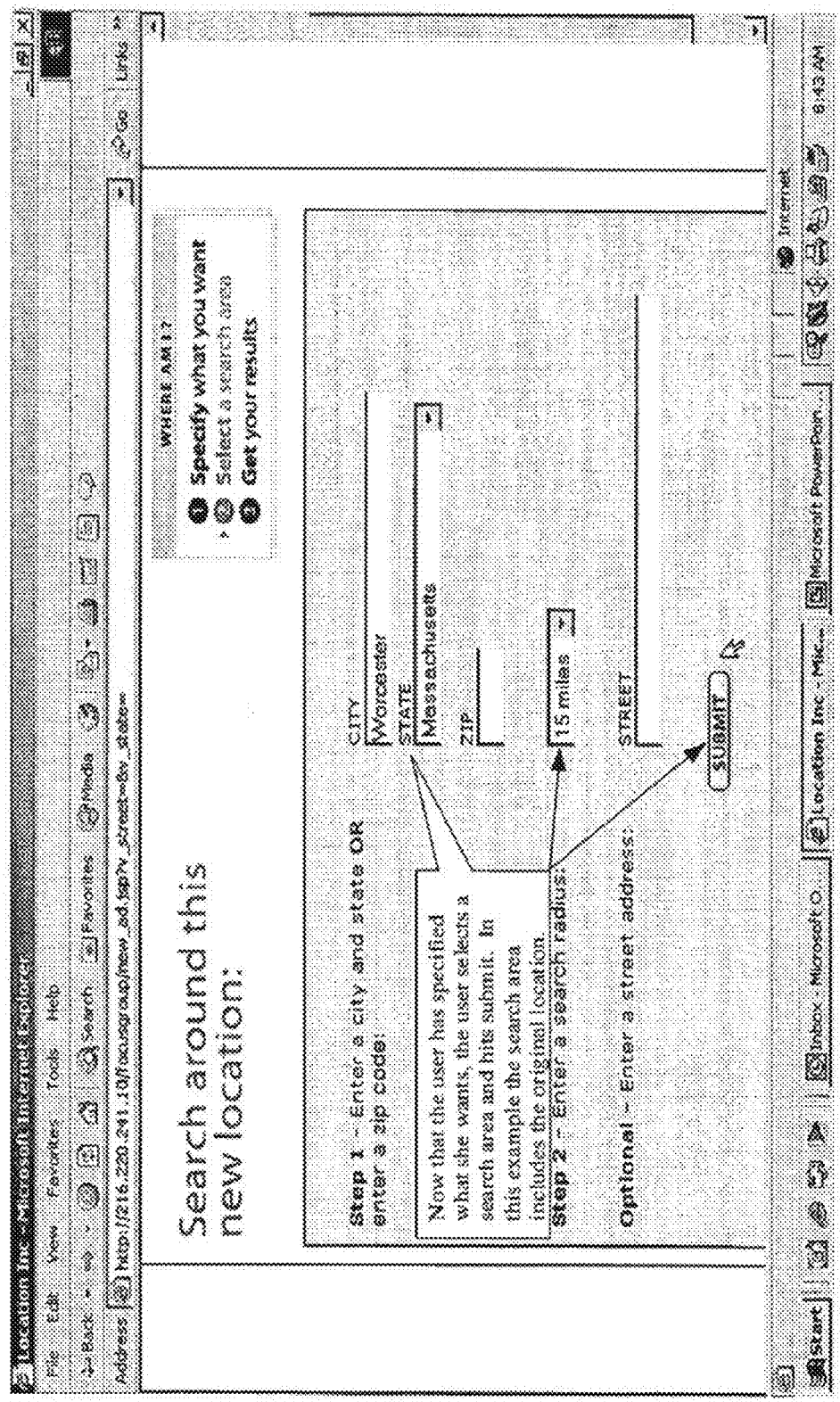

For example, if a user loves a location, but wishes it were less expensive, or had better schools, the user can select key words to specify just those changes while leaving everything else about the location the same, and then the user can search for locations that match this modified set of criteria. The screen display and selection of this feature is shown in FIG. 19. The user first selects a location that he or she likes, but wishes were slightly different (FIG. 20). The user is then presented with a scrollable page and asked to add or subtract words to modify the location as they wish. FIGS. 21-25 show how this location—39 Wildrose Avenue, Worcester, Mass., is currently described, and all the things the user could chose to modify it. The user is then presented with a screen display as shown in FIG. 26, and in this example has chosen to modify the desired location to have top-quality public schools, and very low crime. Everything else the user wishes to remain the same. The user then selects a search area and hits submit as shown in FIG. 27. In this example, the search area includes the original location.

Figure 28:
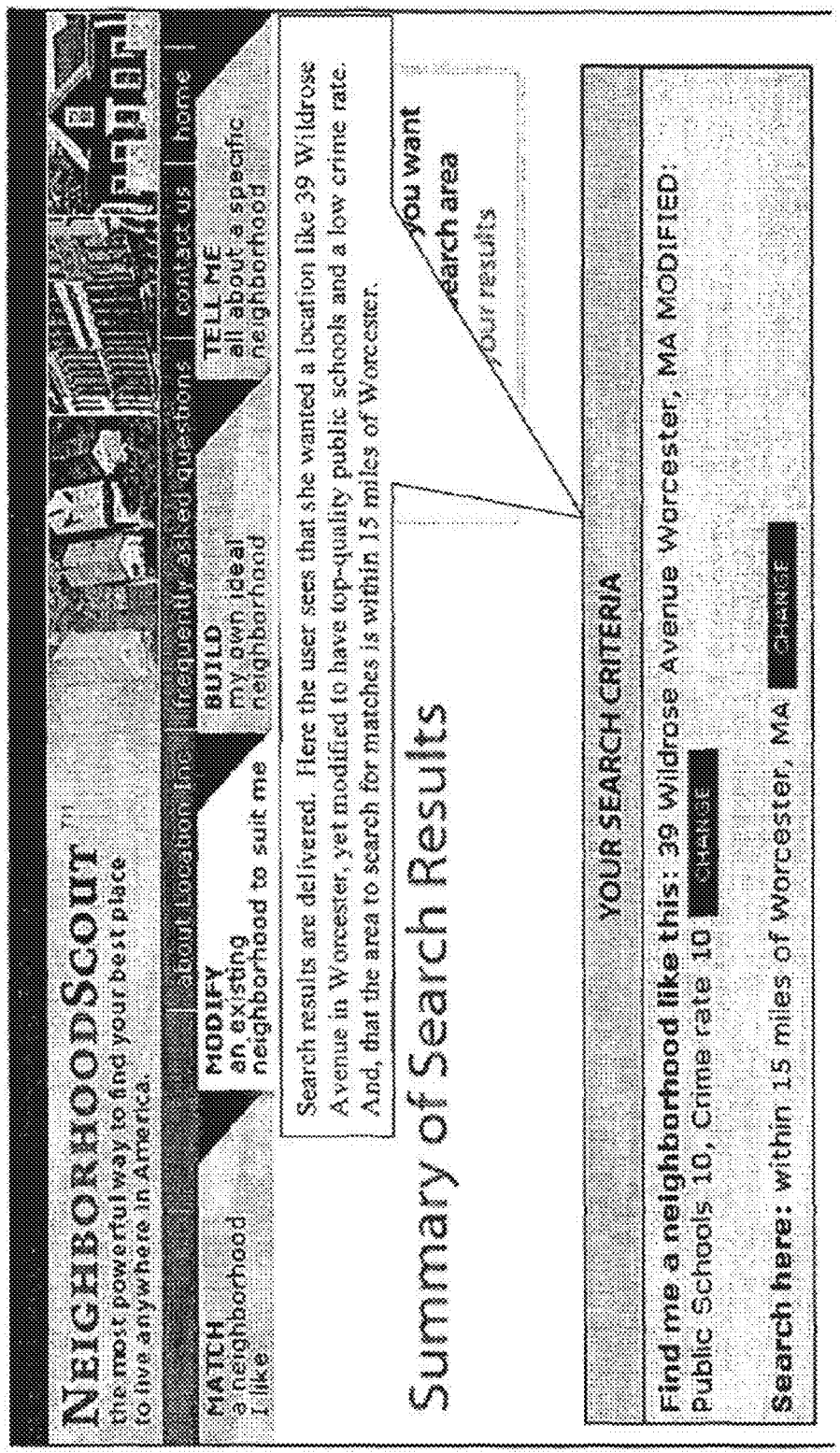

Search results are delivered as shown in FIGS. 28 and 29. Here, the user sees that she wanted a location like 39 Wildrose Avenue in Worcester, yet modified to have top-quality public schools and a low crime rate. And, that the area to search for matches is within 15 miles of Worcester. Here, the results are presented with match levels. One can see that the second best match in the search area is the original, unmodified neighborhood itself. The best match is a location in Holden, Mass.

The unique calculation used to match modified locations is performed as follows. The essence of the calculation in G is described here:

$$G. \quad M\mathrm{mod} = \left(\left(\sum_k (x_{kk} - x_{jk}) * 2 + \left(\sum_k ABS(x_{ik} - x_{jk})\right)\right)\right)/n$$

where $M_{mod}$=a location's match level to the combination of both the modified and unmodified key word values for which we are searching for matches, $X_{jk}$=value of the rank percent score for key word k for location l, $X_{hk}$=the user selected value for the rank percent score for modified key word k (if a check box is used, than the value will be zero, for drop-down boxes, the value can be anything the user chooses), and n=the sum of the number of k key words modified *2, and the number of k key words unmodified.

The absolute difference is summed between rank percent scores for each unmodified characteristic of the location to match, and each location in the user-specified search area. This summed difference between each compared location is saved. This summed difference is then added to the summed absolute difference for the rank percent scores the user has modified. These modified scores, however, are first multiplied by 2 to increase their relative importance because the user purposefully wants to change them. Then, these two absolute difference values are summed, and divided by the number of modified key words (on this instance 2), plus the number of key words unmodified (=n). This value is then subtracted from 100 to give a match level where 0=no match, and 100=a perfect match.

Obviously, many modifications and variations of the present invention are possible in light of the above teachings. It is, therefore, to be understood that within the scope of the present application, the present invention may be practiced otherwise than as specifically described.

What is claimed:

1. A computer-implemented method of displaying a plurality of geographic locations having a greatest similarity to at least one user identified characteristic, the method comprising the steps of:
   calculating a numeric value that represents a relative measure at which at least one characteristic exists in each geographic location of a plurality of geographic locations in a database, whereby a plurality of numeric values are calculated, and associating the plurality of numeric values with the plurality of geographic locations within the database;
   allowing a user to select at least one user identified characteristic associated with the plurality of geographic locations within the database;
   automatically comparing the numeric value associated with each of the plurality of geographic locations in the database to determine overall dissimilarities or similarities between each of the numeric values based on the at least one user identified characteristic;
   automatically generating an ordered list of geographic locations from greatest to least similarity in the at least one user identified characteristic based on the smallest determined dissimilarities or greatest determined similarities of the overall dissimilarities or similarities in the plurality of numeric values; and
   providing, for display on a user's device, data identifying the plurality of geographic locations having a greatest similarity to the at least one user identified characteristic;
   wherein each of the at least one user identified characteristics is based on where a geographic location is located and describes features and characteristics of locations in terms of one or more of demographics, crime, schools, geographical information, or housing; and
   wherein each of the at least one user identified characteristics defines characteristics of geographic locations without requiring the user to specify numeric values.

2. The method of claim 1, wherein the step of automatically comparing the numeric value associated with each of the plurality of geographic locations in the database comprises generating a plurality of rank percent scores.

3. The method of claim 1, wherein the step of automatically comparing the numeric value associated with each of the plurality of geographic locations in the database comprises generating a rank percent score for each of the plurality of geographic locations for each of the at least one user identified characteristic.

4. The method of claim 1, wherein said step of automatically comparing the numeric value associated with each of the plurality of geographic locations in the database comprises:
   for each of the plurality of geographic locations:
      generating an actual rank percent score for each user identified characteristic of the at least one user identified characteristic; and
      for each user identified characteristic of the at least one user identified characteristic, generating an absolute average difference between a best possible rank percent score for the user identified characteristic and the actual rank percent score for the user identified characteristic.

5. The method of claim 4, further comprising allowing the user to choose a search area to which the ordered list of geographic locations will be limited.

6. The method of claim 1, further comprising providing, for display on a user's device, data identifying, the ordered list of geographic locations from greatest to least similarity in the at least one user identified characteristic.

7. A computer-implemented method of identifying a plurality of geographic locations that have the greatest similarity to a user selected geographic location, the method comprising the steps of:
   calculating a numeric value that represents a relative measure at which at least one user identified characteristic exists in each of a plurality of geographic locations in a database, whereby a plurality of numeric values are calculated, and associating the plurality of numeric values with of the plurality of geographic locations within a database;
   allowing a user to select a first geographic location of the plurality of geographic locations in the database;
   allowing the user to modify one of the at least one user identified characteristic associated with the first geographic location;
   automatically recalculating the numeric value of the one of the at least one user identified characteristic modified by the user;
   automatically comparing the recalculated numeric value with the numeric values of the plurality of numeric values that are associated in the database with geographic locations of the plurality of geographic locations that are not the first geographic location to determine overall dissimilarities or similarities;
   automatically generating an ordered list of geographic locations that are most similar to the first geographic location as modified by the user based on the smallest determined dissimilarities or greatest determined similarities of the overall dissimilarities or similarities; and
   providing, for display on a user's device, data identifying the plurality of geographic locations having a greatest similarity to the at least one user identified characteristic;
   wherein each of the at least one user identified characteristics is based on where a geographic location is located and describes features and characteristics of locations in terms of one or more of demographics, crime, schools, geographical information, or housing; and
   wherein each of the at least one user identified characteristics defines characteristics of geographic locations without requiring the user to specify numeric values.

8. The method of claim 7, wherein the steps of automatically comparing the recalculated numeric value with the numeric values of the plurality of numeric values that are associated in the database with regional geographic locations of the plurality of geographic locations that are not the first geographic location and automatically generating an ordered list of the geographic locations that are most similar to the first geographic location as modified by the user further comprises:
   automatically generating a dissimilarity matrix in which an overall dissimilarity value of a plurality of dissimilarity values is assigned to each of the geographic locations that are not the first geographic location relative to the numeric value of the at least one user identified characteristic of the first geographic location as modified by the user through selection of keyword descriptors, and generating the ordered list based on a smallest of the plurality of dissimilarity values between the first geographic location as modified by the user and the geographic locations within the database that are not the first geographic location.

9. The method of claim 7, further comprising providing, for display on a user's device, data identifying the ordered list of geographic locations that are most similar to the user selected geographic location as modified by the user based on the smallest dissimilarities or the greatest similarities in the numeric values.

10. The method of claim 7, wherein the overall dissimilarities or similarities between each of the numeric values based on the user identified characteristic are represented by a dissimilarity value.

11. A computer-implemented method of identifying a plurality of locations that have a greatest similarity in at least one user identified characteristic to a user selected geographic location, the method comprising:

calculating a numeric value that represents a quantitative representation at which the at least one user identified characteristic exists in each of a plurality of geographic locations, whereby a plurality of numeric values are calculated, and associating the plurality of numeric values with the plurality of geographic locations;

providing a database containing the plurality of geographic locations and the plurality of numeric values associated therewith;

allowing a user to select a first geographic location of the plurality of geographic locations;

for each user identified characteristic of the at least one user identified characteristic, comparing the numeric value associated with the first location with the numeric value associated with each geographic location of the plurality of geographic locations that is not the first geographic location to determine overall dissimilarities or similarities in the plurality of geographic locations;

generating an ordered list of geographic locations that are most similar to the first geographic location based on the determined smallest dissimilarities or greatest determined similarities of the determined overall dissimilarities or similarities; and providing, for display on a user's device, data identifying the plurality of geographic locations having a greatest similarity to the at least one user identified characteristic;

wherein each of the at least one user identified characteristics is based on where a geographic location is located and describes features and characteristics of locations in terms of one or more of demographics, crime, schools, geographical information, or housing; and wherein each of the at least one user identified characteristics defines characteristics of geographic locations without requiring the user to specify numeric values.

12. The method of claim 11, wherein the step of, for each user identified characteristic of the at least one user identified characteristic, comparing the numeric value associated with the first geographic location with the numeric value associated with each geographic location of the plurality of geographic locations that is not the first geographic location further comprises generating a dissimilarity matrix in which an overall dissimilarity value is assigned to each of the plurality of locations that is not the first geographic location, the overall dissimilarity value being relative to the first geographic location.

13. The method of claim 12, wherein the step of generating a dissimilarity matrix further comprises:

applying an extraction method to raw data, the extraction method including a factor analysis to extract factors from the database; and applying a squared Euclidian distance measure to the extracted factors.

14. The method of claim 11, wherein the step of, for each user identified characteristic of the at least one user identified characteristic, comparing the numeric value associated with the first geographic location with the numeric value associated with each geographic location of the plurality of geographic locations that is not the first geographic location further comprises:

for each particular geographic location of the plurality of geographic locations that is not the first geographic location:

calculating, for each of the at least one user identified characteristic, a squared difference between the numeric value associated with the first geographic location and the particular geographic location that is not the first geographic location, whereby a plurality of squared differences are calculated for the particular geographic location that is not the first geographic location; and summing the plurality of squared differences to create a cumulative dissimilarity value between the first geographic location and the particular geographic location that is not the first geographic location.

15. The method of claim 11, further comprising providing, for display on a user's device, data identifying the ordered list of geographic locations that are most similar to the user selected geographic location as modified by the user based on the smallest dissimilarities or greatest similarities in the numeric values.

16. The method of claim 11, wherein the overall dissimilarities or similarities between each of the numeric values based on the user selected user identified characteristic are represented by a dissimilarity value.

* * * * *